(12) United States Patent
Ellenby et al.

(10) Patent No.: US 6,804,726 B1
(45) Date of Patent: *Oct. 12, 2004

(54) METHOD AND APPARATUS FOR CONTROLLING ELECTRICAL DEVICES IN RESPONSE TO SENSED CONDITIONS

(75) Inventors: John Ellenby, San Francisco, CA (US); Peter Malcolm Ellenby, San Francisco, CA (US); Thomas William Ellenby, San Francisco, CA (US)

(73) Assignee: Geovector Corporation, San Francisco, CA (US)

(*) Notice: Subject to any disclaimer, the term of this patent is extended or adjusted under 35 U.S.C. 154(b) by 270 days.

This patent is subject to a terminal disclaimer.

(21) Appl. No.: 09/628,081

(22) Filed: Jul. 28, 2000

Related U.S. Application Data

(63) Continuation-in-part of application No. 09/416,093, filed on Oct. 12, 1999, now Pat. No. 6,098,118, which is a continuation of application No. 08/859,997, filed on May 21, 1997, now Pat. No. 5,991,827.
(60) Provisional application No. 60/018,405, filed on May 22, 1996.

(51) Int. Cl.[7] ............................................. G06F 13/00
(52) U.S. Cl. ............................... 710/8; 710/14; 710/15; 710/16; 710/18; 710/62
(58) Field of Search ............................... 710/8, 14, 15, 710/16, 18, 62

(56) References Cited

U.S. PATENT DOCUMENTS

| | | | |
|---|---|---|---|
| 4,125,871 A | 11/1978 | Martin | 364/900 |
| 4,598,355 A | 7/1986 | Shepler et al. | 364/184 |
| 4,603,582 A * | 8/1986 | Middleton | 73/511 |
| 4,700,307 A * | 10/1987 | Mons et al. | 701/220 |
| 4,725,735 A | 2/1988 | Ariel et al. | 250/386 |
| 4,994,988 A * | 2/1991 | Yokoi | 358/1.13 |
| 5,103,192 A * | 4/1992 | Sekine et al. | 331/1 A |
| 5,106,655 A * | 4/1992 | Boissevain et al. | 427/296 |
| 5,164,931 A * | 11/1992 | Yamaguchi et al. | 369/44.29 |
| 5,291,073 A | 3/1994 | Lewandowski | 307/310 |
| 5,535,125 A * | 7/1996 | Okabe | 701/211 |
| 5,541,831 A | 7/1996 | Thomas | 364/148 |
| 5,603,570 A | 2/1997 | Shimizu | 374/100 |
| 5,617,317 A * | 4/1997 | Ignagni | 701/215 |
| 5,694,335 A | 12/1997 | Hollenberg | 364/514 |
| 5,757,365 A | 5/1998 | Ho | 345/212 |
| 5,763,961 A | 6/1998 | Dreyer et al. | 307/116 |
| 5,907,491 A | 5/1999 | Canada et al. | 364/468.15 |
| 5,974,476 A * | 10/1999 | Lin et al. | 710/14 |
| 6,012,105 A * | 1/2000 | Rubbmark et al. | 710/14 |
| 6,026,690 A * | 2/2000 | Nakagawa et al. | 73/654 |
| 6,122,595 A * | 9/2000 | Varley et al. | 701/220 |

FOREIGN PATENT DOCUMENTS

| | | | |
|---|---|---|---|
| EP | 0622721 A1 | 2/1994 | G06F/1/32 |
| JP | 408030576 A * | 2/1996 | G06F/15/78 |

* cited by examiner

*Primary Examiner*—Rehana Perveen
(74) *Attorney, Agent, or Firm*—Wilson Sonsini Goodrich & Rosati

(57) ABSTRACT

A system is disclosed that senses physical characteristics of an electronic device. The system controls the electronic device in response to the sensed physical characteristics. The system includes a control subsystem. The control subsystem includes a time trigger and an anticipation/latency reduction subsystem. The anticipation/latency reduction subsystem includes additional subsystems such as a time trigger, a position trigger and an attitude trigger. In an alternate embodiment, the anticipation/latency reduction subsystem also includes an activation interval trigger, a repetitive action trigger and a repetitive distance trigger. The various triggers can be implemented using processors that execute software. The system also includes sensing devices, such as a position sensing device and an attitude sensing device, to sense physical characteristics of the particular electronic device being controlled. The control subsystem receives signals from the sensing devices. Physical characteristic information obtained from these signals is provided to the various triggers. In response to this physical characteristic information, the various triggers process the physical characteristic information such that the system controls the electronic device.

8 Claims, 26 Drawing Sheets

FIG.−18

ACTIVATION INTERVAL TRIGGER (AIT)     211

RISC #14     2202
STORES ACTIVATION INTERVAL TRIGGER (AIT) VALUE

RISC #15     2204
STORES TIME AT WHICH SYSTEM MONITOR MODE WAS ACTIVATED.

RISC #16     2206
CALCULATES TIME ELAPSED FROM TIME STORED IN RISC #15 TO PRESENT TIME.

RISC #17     2208
COMPARES ELAPSED TIME CALCULATED IN RISC #16 WITH AIT VALUE STORED IN RISC #14

RISC #18     2210
IF USER HAS ACTIVATED ELECTRONIC DEVICE; PLACES ELAPSED TIME CALCULATED IN RISC #16, THE DOWN TIME INTERVAL (DTI) AT THE TOP OF A LIST OF DTI'S. IF LIST IS FULL OLDEST DTI IS BUMPED FROM LIST

RISC #19     2212
COMPARES DTI'S IN LIST CREATED IN RISC #18 TO SEE IF A MAJORITY ARE WITHIN A SET PERCENTAGE OF EACH OTHER.

RISC #20     2214
AVERAGES THOSE DTI'S THAT ARE WITHIN DEFINED PERCENTAGE OF EACH OTHER, IF ANY, AND UPDATES THE AIT VALUE STORED IN RISC #14

*FIG. −22*

REPETITIVE ACTION TRIGGER (RAT) 212

RISC #30 2302

PLACES PRESENT SYSTEM ATTITUDE AT THE TOP
OF A LIST OF ATTITUDE READINGS. IF LIST IS FULL OLDEST ATTITUDE
READING IS BUMPED FROM LIST

RISC #31 2304

STORES REPETITIVE ACTION
TRIGGER (RAT) VALUE.

RISC #32 2306

COMPARES LIST GENERATED IN RISC #30
WITH RAT VALUE STORED IN RISC #31

RISC #33 2308

IF USER HAS ACTIVATED ELECTRONIC DEVICE;
STORES LIST GENERATED IN RISC #30 AS A MOTION ROUTINE
AT THE TOP OF A LIST OF MOTION ROUTINES. IF LIST IS FULL
OLDEST MOTION ROUTINE IS BUMPED FROM LIST

RISC #34 2310

COMPARES MOTION ROUTINES IN LIST CREATED
IN RISC #33 TO SEE IF A MAJORITY ARE WITHIN A
SET PERCENTAGE OF EACH OTHER.

RISC #35 2312

AVERAGES THOSE MOTION ROUTINES THAT ARE WITHIN A
DEFINED PERCENTAGE OF EACH OTHER, AS
ASCERTAINED IN RISC #34, AND UPDATES THE RAT
VALUE STORED IN RISC #30

FIG.-23

REPETITIVE DISTANCE TRIGGER (RDT) 213

RISC #21 2402
STORES REPETITIVE DISTANCE TRIGGER (RDT) VALUE

RISC #22 2404
STORES POSITION AT WHICH SYSTEM MONITOR MODE WAS ACTIVATED.

RISC #23 2406
CALCULATES DISTANCE TO POSITION STORED IN RISC #22 FROM PRESENT POSITION.

RISC #24 2408
COMPARES DISTANCE CALCULATED IN RISC #23 WITH RDT VALUE STORED IN RISC #21

RISC #25 2410
IF USER HAS ACTIVATED ELECTRONIC DEVICE; PLACES DISTANCE CALCULATED IN RISC #23, THE DOWN DISTANCE INTERVAL (DDI) AT THE TOP OF A LIST OF DDI'S. IF LIST IS FULL OLDEST DDI IS BUMPED FROM LIST

RISC #26 2412
COMPARES DDI'S IN LIST CREATED IN RISC #25 TO SEE IF A MAJORITY ARE WITHIN A SET PERCENTAGE OF EACH OTHER.

RISC #27 2414
AVERAGES THOSE DDI'S THAT ARE WITHIN DEFINED PERCENTAGE OF EACH OTHER, IF ANY, AND UPDATES THE RDT VALUE STORED IN RICS #21

FIG.-24

METHOD AND APPARATUS FOR CONTROLLING ELECTRICAL DEVICES IN RESPONSE TO SENSED CONDITIONS

This application is a continuation-in-part of U.S. Ser. No. 09/416,093, filed Oct. 12, 1999 (now U.S. Pat. No. 6,098,118) which is a continuation of U.S. Ser. No. 08/859,997, filed May 21, 1997, now U.S. Pat. No. 5,991,827, which claims the benefit of provisional patent application No. 60/018,405, entitled Systems and Methods For Anticipating User Actions For Improving Electrical Device Performance, filed May 22, 1996 by inventors John Ellenby, Peter Malcolm Ellenby and Thomas William Ellenby. Each of the above-identified patent applications is incorporated herein by reference in its entirety.

FIELD OF THE INVENTION

The present invention relates to methods and apparatus for improving the performance of electrical devices, and more particularly to methods and apparatus that sense a variety of conditions and that control electrical devices in response to the conditions sensed.

BACKGROUND

Electronic devices are typically designed to perform specific functions. From the moment an electronic device is turned on, it may be fully functional to perform its designed task. This approach may be fine for simple devices. This approach, however, may present disadvantages in complex systems. For example, a complex system may consume relatively large amounts of power. If the complex system is fully functional at all times, power consumption typically remains high even when the system is not actually being used. This relatively high power consumption can be a particularly important concern for battery-powered systems where high power consumption can cause a short operational life.

Another characteristic of conventional electronic devices is that they may have several modes of operation and may be designed to start in one of those modes when turned on. Such devices may switch modes only in response to a physical user interaction, such as pressing a predetermined button, for example. Such a design may work for simple devices. Complex systems, however, may take a relatively long time to switch from one mode of operation to another. In addition, it may be inconvenient for a user to have to manually switch the system between modes. If a complex system is designed to always start in one mode when turned on, or to switch to another mode only when manually selected, the length of the switching time and the time required by the user to get to the system to initiate the switch could hinder the performance of the electronic system.

Accordingly, there has been a need for a method and apparatus that increases battery life of an electrical device by allowing the device to power up and power down components therein at appropriate times. There has also been a need for a method and apparatus that reduces the latency (i.e. the delay) between the time a user decides to operate a device in a certain mode and the actual mode switching. Latency can also refer to the latency between the time that the user decides to turn a device on or off and the actual switching on or off of the device.

SUMMARY

An aspect of the invention is to provide a method and/or apparatus that controls an electrical device by sensing whether or not a user is using or is about to use the device. The method and/or apparatus can cause the electrical device to activate power hungry components only when they are likely to be needed. The method and/or apparatus can also cause the electrical device to de-activate power hungry components when they are not needed.

An aspect of the invention is to provide a method and/or apparatus that controls an electrical device by sensing when a user would like to switch to a desired mode of operation of the electrical device and to switch the modes of the device in response thereto. An aspect of the invention is to activate and/or deactive components or to switch between modes of an electrical device in response to a variety of events and/or conditions, such as change in position of the device, distance of the device to or from a target object or target position, visual events or repetitive events, for example. Alternate embodiments of the invention might observe different types of condition, such as rate of acceleration or change in rate of acceleration of the device. Embodiments of the present invention can progressively activate components of the electrical device as it becomes more and more likely that the components are going to be needed by the electrical device. In particular, if it appears based upon sensed conditions that the electrical device is going to go into a desired mode and that particular components of the electrical device are going to be needed in the desired mode, the embodiment of the invention can activate individual components of the electrical device at different points in time as it becomes more and more likely that the components will be needed. This progressive activation could be staged in such a way that as more indications are sensed that the particular components are going to be needed (e.g. indications of user intent to put the electronic device into a particular mode are sensed), then the resources dedicated to the desired mode, for example, will be increased. Similarly, embodiments of the present invention could allow progressive deactivation of components of the electrical device as it becomes less and less likely that the components will be needed.

BRIEF DESCRIPTION OF THE DRAWINGS

These and other features and advantages of the present invention will become more apparent to those skilled in the art from the following detailed description in conjunction with the appended drawings in which:

FIG. 22 illustrates the hardware of the activation interval trigger of FIGS. 2 and 7;

FIG. 23 illustrates the hardware of the repetitive action trigger of FIGS. 2 and 8;

FIG. 24 illustrates the hardware of the repetitive distance trigger of FIGS. 2 and 9;

DETAILED DESCRIPTION

An embodiment of the present invention comprises a novel system for improving the performance of electronic devices and related methods. The following description is presented to enable a person skilled in the art to make and use the invention. Descriptions of specific applications are provided only as examples. Various modifications to the preferred embodiments will be readily apparent to those skilled in the art, and general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
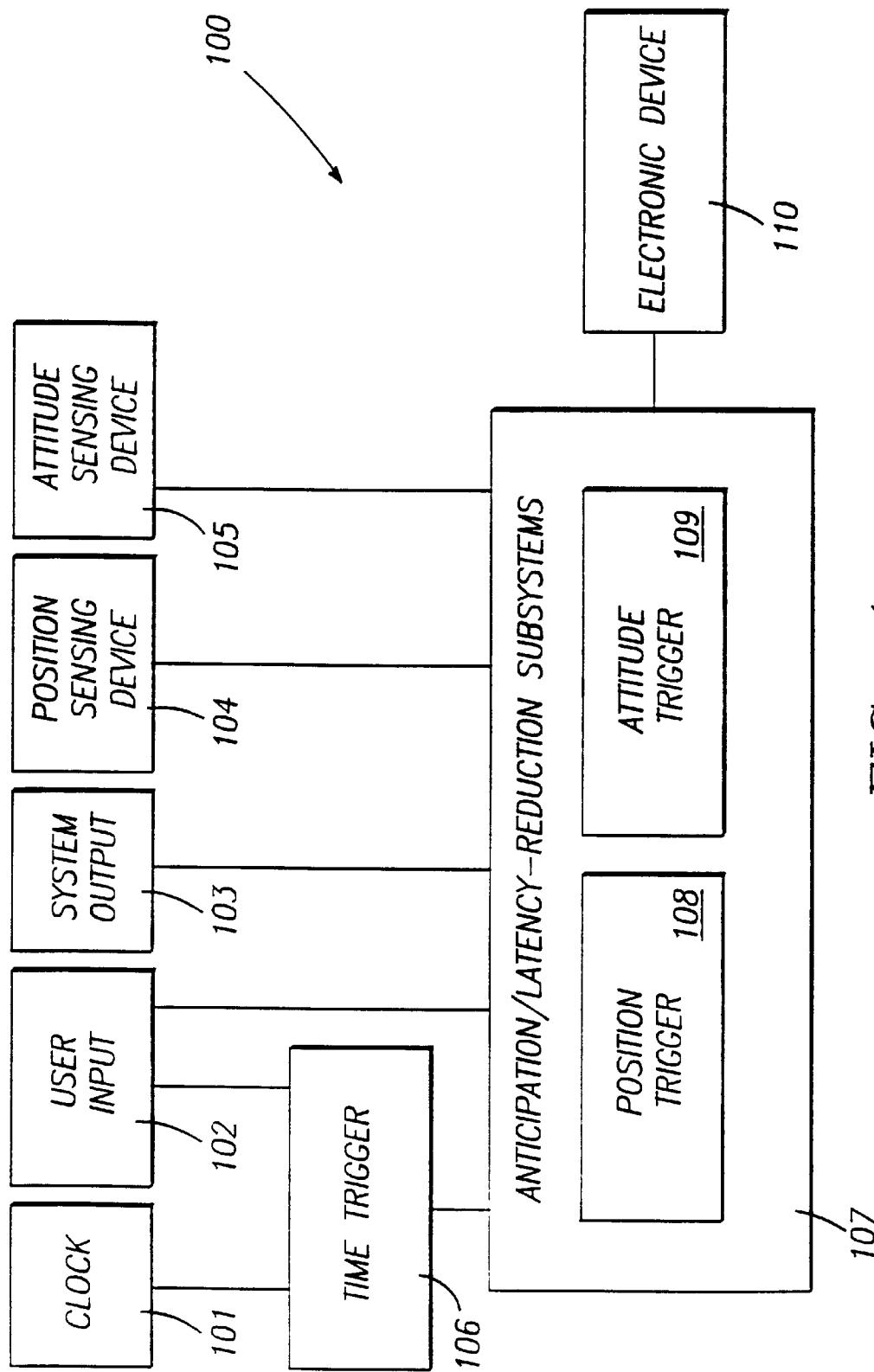
FIG. 1 illustrates system 100 which is an embodiment of the invention.
Figure 12:
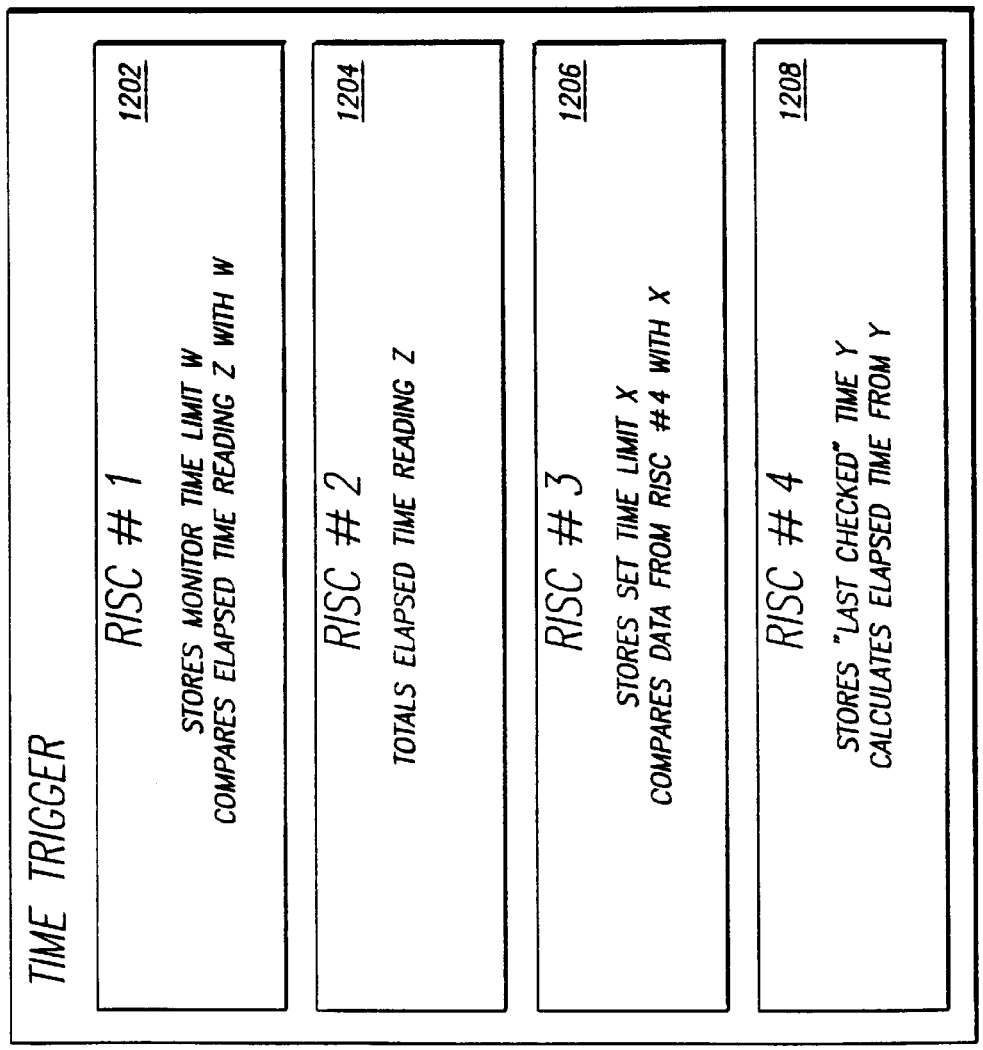
FIG. 12 illustrates a time trigger that can be used by embodiments of the invention.
Figure 13:
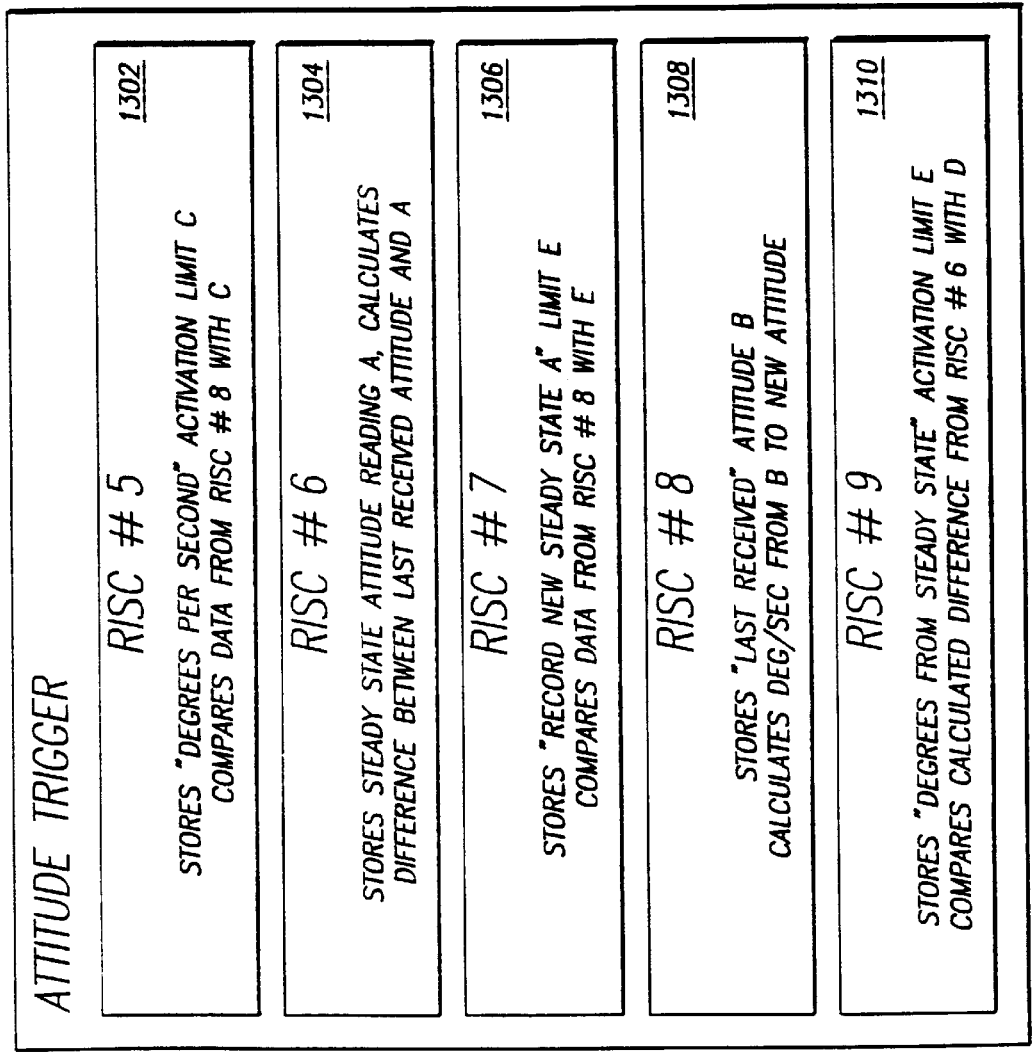
FIG. 13 illustrates an attitude trigger that can be used by embodiments of the invention.
Figure 14:
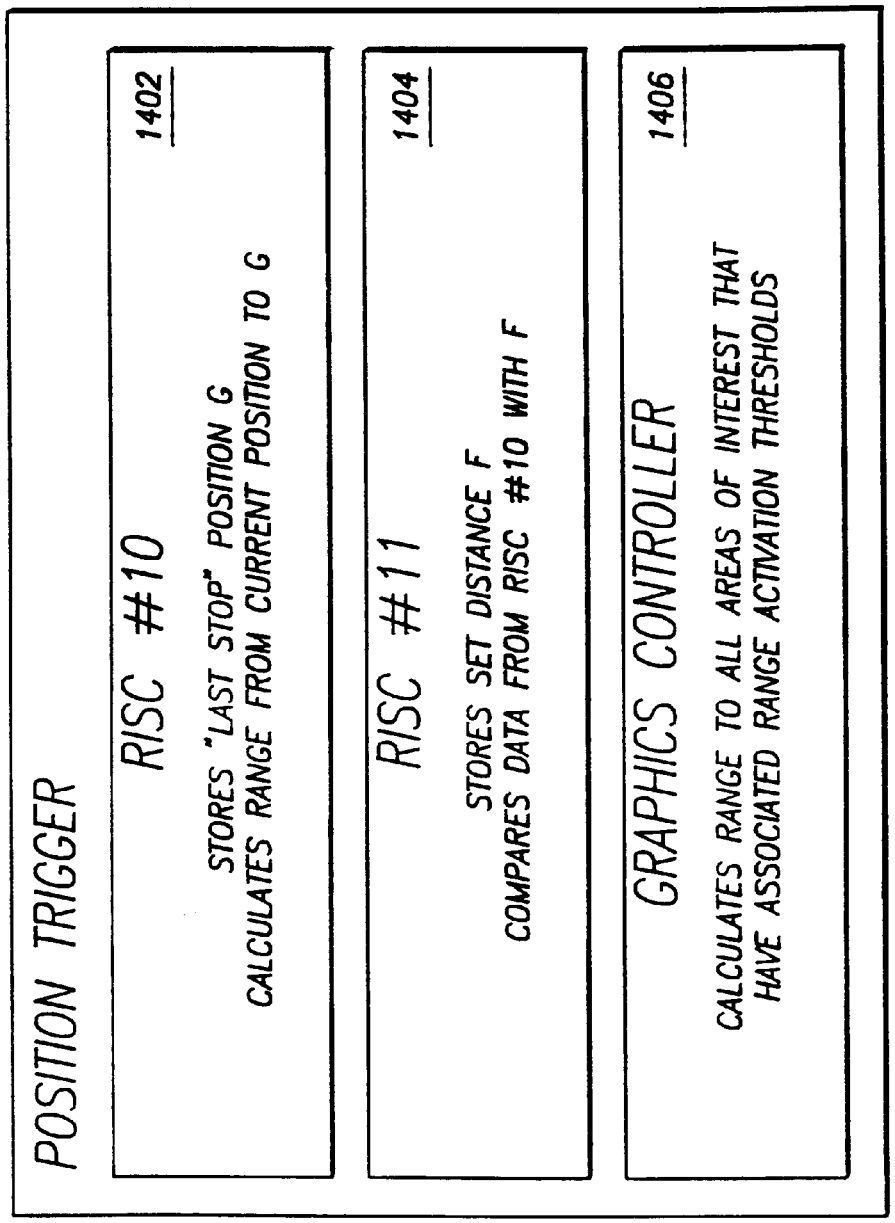
FIG. 14 illustrates a position trigger that can be used by embodiments of the invention.

FIG. 1 illustrates a block diagram of system 100 which is a first embodiment of the invention. This system 100 is a device usage detection system that monitors the physical characteristics of an electronic device 110 or monitors other predefined conditions in order to activate or otherwise control the electronic device 110. System 100 activates or controls device 110 when the system detects indications of intent to use or other predefined conditions. System 100 comprises a clock 101, a user input 102, a system output 103, a position sensing device 104, an attitude sensing device 105, a time trigger 106, and an anticipation/latency-reduction subsystem 107. The clock 101, the time trigger 106, and the anticipation/latency reduction subsystem 107 form a control subsystem. Alternate embodiments are not limited to this particular control system or to control systems that have structure equivalent to this particular control system. The user input 102 can be any form of input mechanism including without limitation a keyboard, a mouse, scroll keys and a graphical user interface, or some form of magnetic, optical or electronic storage, for example. The system output 103 can be any form of output that enables the system 100 to communicate externally, either with a user or another type of electronic device for example. Thus, it could be a display or some form of communications port such as a network port. Both input and output could be achieved using remote transmission techniques such as wireless and/or infrared transmissions, for example. Communication between the sensing devices and the control subsystem can also be accomplished using a variety of techniques including remote transmissions. The position sensing device 104 typically is a satellite based positioning system, such as GPS or GLONAS, though other position sensing devices, or inertial navigation systems, for example, can be used. The attitude sensing device 105 typically is a magnetic flux sensing device 105, such as a flux gate compass or tri-axial magnetometer, though other attitude sensing devices, such as inclinometers and laser ring gyros, can be used. The anticipation/latency-reduction subsystem 107 further comprises a position trigger 108 and an attitude trigger 109. Embodiments of the time trigger 106, the attitude trigger 109 and the position trigger 108 are shown in FIGS. 12, 13 and 14, respectively.

As shown in FIG. 1, the output of the clock 101 and the user input 102 are coupled to the time trigger 106. The user input 102, the outputs of the time trigger 106, the position sensing device 104, and the attitude sensing device 105 are coupled to the anticipation/latency-reduction subsystem 107, and hence to the position trigger 108 and the attitude trigger 109. The output of the anticipation/latency subsystems 107 is coupled to the electronic device 110.

Figure 3:
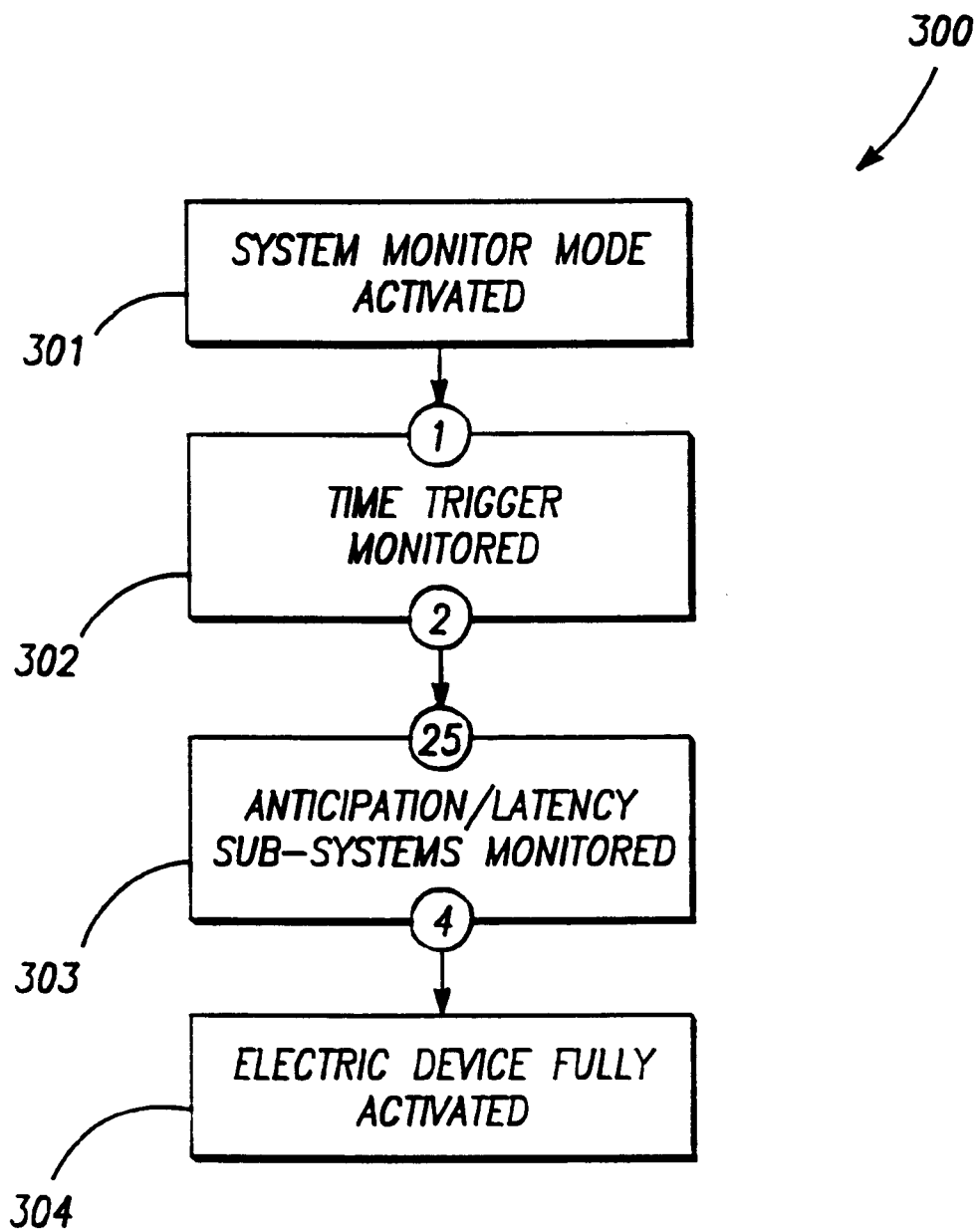
FIG. 3 illustrates the main flow of operation of the system 100.

FIG. 3 is a flowchart 300 of the general operation of the system 100. In step 301, the user activates the system monitor mode. In this mode, the system 100 monitors the time trigger 106, step 302, and periodically monitors the anticipation/latency subsystem 107, step 303, for certain defined conditions. If the certain defined conditions are met, the system 100 activates the electronic device 110, step 304. The signal used to control the electronic device in response to sensed physical conditions of the electronic device, for example, shall be referred to as a control signal. In embodiments of the invention, such defined conditions might be the electronic device 110 coming within or going out of a predefined distance of a certain object or position, a user coming within or going out of a predefined proximity to the electronic device 110, vibration of the electronic device 110, or attitude of the electronic device. Alternate embodiments might sense other physical characteristics of the electronic device 110 including without limitation acceleration or change in acceleration of the electronic device 110, for example. Activation or deactivation of the electronic device can be thought of as switching modes of the electronic device. Such mode switching might involve activation and/or deactivation of the entire device or activation and/or deactivation of only portions of the device.

Figure 5:
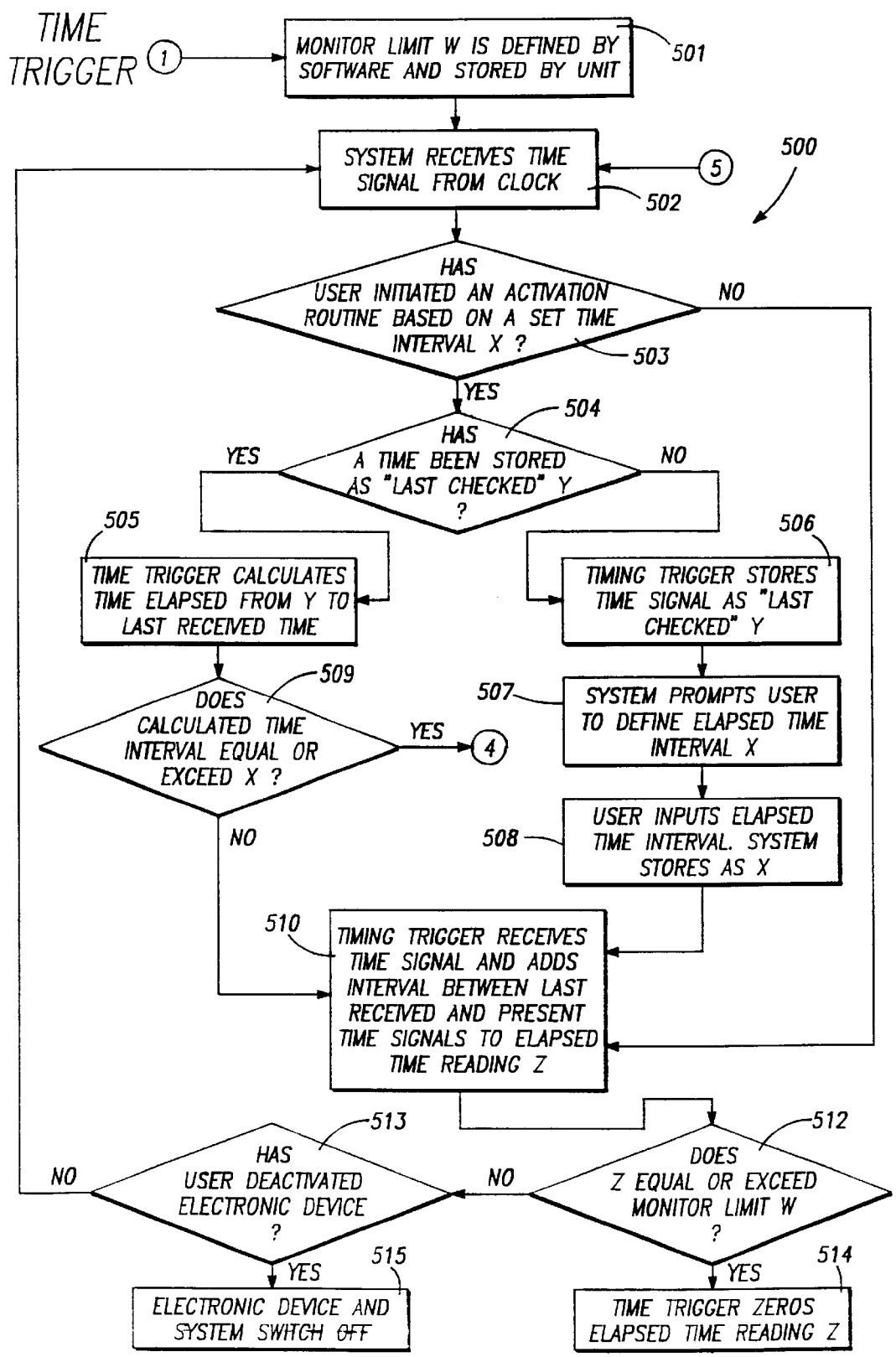
FIG. 5 illustrates the operation of a time trigger that can be used by embodiments of the invention.

FIG. 5 is a flowchart 500 of the operation of the time trigger 106. This trigger 106 implements a delay between the periods in which the system 100 monitors its anticipation/latency reduction subsystems. It also implements time activation routines. In a time activation routine, a user might indicate that it would like the device 110 to be activated or deactivated within a specified period of time from the time the activation routine is initiated. The user might use such an activation routine to instruct the trigger 106 to activate the device 110 every 10 minutes. In alternate embodiments of the invention, a time activation routine may be used to progressively activate portions of the device 110 at a number of user specified times. Such a system might be used where it is desirable to turn on different components of the device 110 at different times. Thus, such a system might turn on first components that take longer to power up or to turn on last components that consume the most power. Such a system might also be used to provide levels of sensing. In particular, the system might use a sensing device that obtains a rough estimate of position until the electronic device comes within a certain range of a target location. Once within that range, the system might power up another sensing device (e.g. more accurate than the first sensing device, but that consumes more power).

In step 501, a monitor limit W is defined by the software used by trigger 106. Limit W, which is stored by trigger 106, is a delay between the monitoring periods in which the system 100 monitors the subsytems 107. For example, if W=50 ms the system 100 operates in the time trigger 106 for 50 ms. After 50 ms, the system 100 branches to monitor the anticipation/latency reduction subsystems 107. The limit W can be adjusted depending on how long the user would like the time trigger 106 to operate before the trigger 106 branches to monitor the subsystems 107. Alternate embodiments may use similar delays in other triggers.

In step 502 of FIG. 5, the system 100 transmits a present time signal from the clock 101 to the time trigger 106. Triggers 108 and 109, discussed below, provide examples of how the system 100 uses a variety of subsytems (e.g. the triggers 108 and 109) and sensing devices (e.g. devices 104 and 105) to monitor conditions. Steps 503–509 of FIG. 5 deal with time activation routines used by the time trigger 106 to activate the electronic device 110 or a portion of the electronic device 110 at user defined periods of time. In step 503 the trigger 106 determines if such an activation routine is active. If not, the flowchart 500 branches to step 510. If such a routine is active, the flowchart 500 branches to step 504. In step 504, the trigger 106 determines if the time activation routine has just been initiated. If so, the trigger 106 stores the present time as the "last checked" time Y, step 506, and prompts the user to input the desired activation time interval X, step 507, and stores X, step 508. This interval X is the time that the trigger 106 waits from the "last checked" time Y (i.e. the time at which the time activation routine is initiated) to activate the device 110. If, in step 504, the trigger 106 determines that the time activation routine was already active, the trigger 106 branches to step 505. In step 505, the trigger 106 calculates the elapsed time from the last checked time Y to the present time and then in step 509 compares this elapsed time to the activation interval X. If the elapsed time is greater than or equal to X, the flowchart branches to step 304 of FIG. 3 and the system 100 fully activates the device 110. If in step 509 the elapsed time is less than X, the flowchart 500 branches to step 510 of FIG. 5. In step 510, the trigger 106 receives a new present time signal and calculates the time difference between the last received time signal received in step 502 and the new present time signal received in step 510. The trigger 106 adds the calculated difference to the elapsed time Z. The trigger 106, in step 512, then compares the elapsed time Z to the monitor limit W. If Z is greater than or equal to W, the trigger 106 sets Z to zero, step 514, and then proceeds to step 1001 of FIG. 10 to check the anticipation/latency-reduction subsystems 107. Thus, step 512 limits the amount of time the time trigger 106 operates before the system 100 branches to monitor the anticipation/latency reduction subsystems 107.

If in step 512 Z is less than W, the trigger 106 checks to see if the user has turned off device 110, step 513, and then returns to step 502 to receive the next present time signal. Step 513 might also be used to determine if the system 100 itself has turned off the device 110 or to determine if some other device has turned off the device 110.

Figure 10:
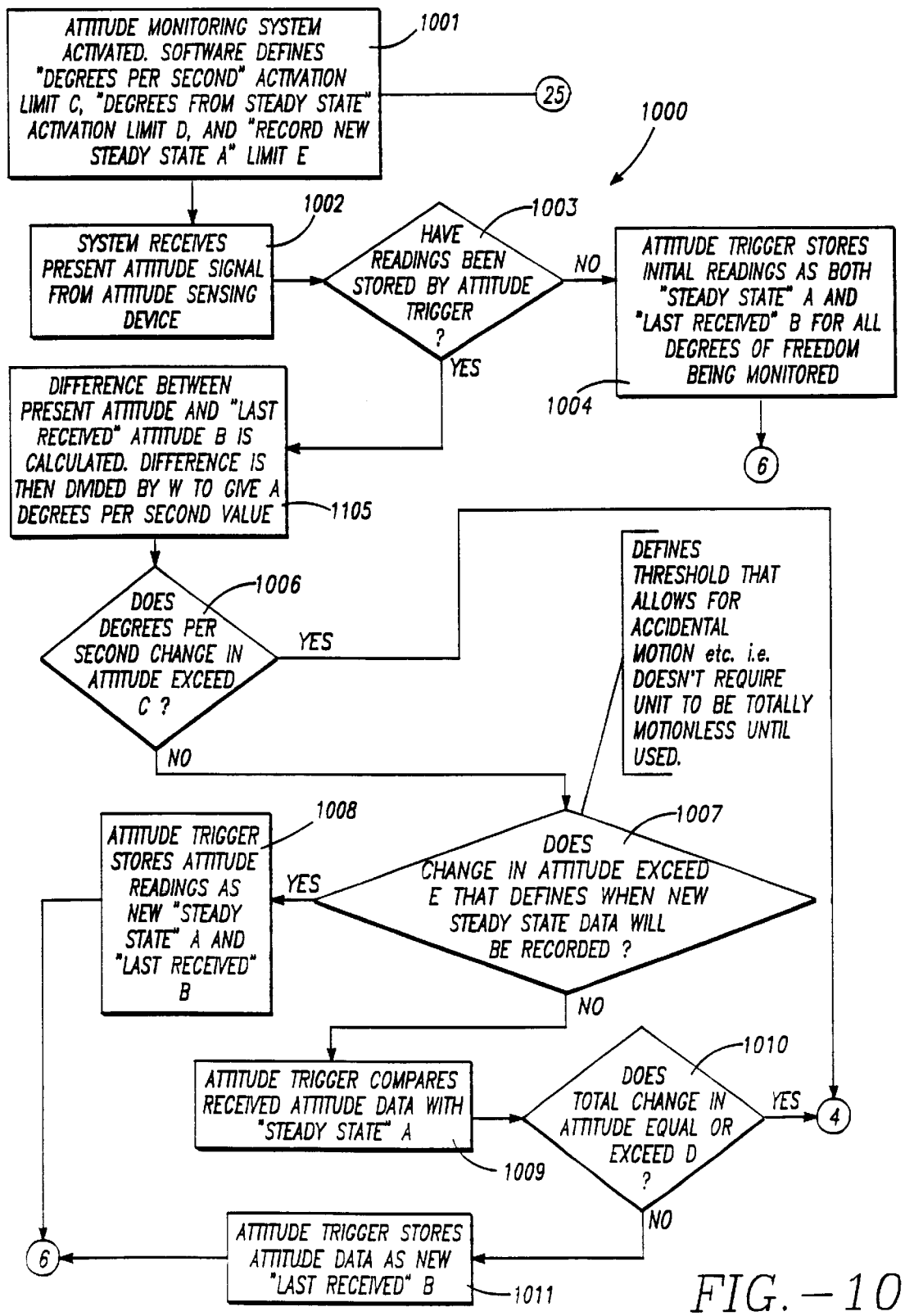
FIG. 10 illustrates the operation of an attitude trigger that can be used by embodiments of the invention.

FIG. 10 is a flowchart 1000 of the operation of the attitude trigger 109. The physical characteristics of the electronic device that are sensed by the attitude sensing device shall be referred to as attitude characteristics. The attitude trigger receives attitude information representing these attitude characteristics. This attitude information is obtained from an attitude signal that comes from the attitude sensing device. In the present embodiment, the attitude trigger 109 is implemented using hardware that executes software. The hardware is described with reference to FIG. 13. The flowchart 1000 illustrates the operation of the attitude trigger 109's software. The attitude trigger checks to determine whether or not the attitude of the electronic device 10 is changing at higher than a specified rate or if the attitude of the electronic device 110 has changed more than a specified amount from a steady state attitude. If the attitude is changing at higher than this specified rate or has changed more than the specified amount, the system 100 activates the electronic device 110. Step 1001 of flowchart 1000 defines a "degrees per second" activation limit C, a "degrees from steady state" activation limit D, and a "record new steady state A" limit E. In step 1002, the trigger 109 receives a present attitude signal from the attitude sensing device 105 and, in step 1003, checks to see if a value for "steady state" attitude A and "last received" attitude B have been stored previously. If values for A and B have not been stored, the trigger 109, in step 1004, stores the present attitude received from the attitude sensor as both A and B and the flowchart 1000 then branches to step 1101 of FIG. 11 to check the position trigger 108. If step 1003 determines that values for A and B have been stored previously, the flowchart 1000 branches to step 1005 where the trigger 109 calculates the difference between the present attitude and "last received" attitude B. The trigger 109 then divides this attitude difference by W to give a degrees per second value that represents a rate of change of the attitude of the electronic device 110, step 1006. The trigger 109 then compares this calculated degrees per second with the "degrees per second" activation limit C, step 1006. If the calculated degrees per second value exceeds C, the flowchart 1000 branches to step 304 of FIG. 3, and the system 100 fully activates the device 110. If the calculated degrees per second value does not exceed C, the flowchart 1000 branches to step 1007.

In step 1007, the trigger 109 determines the difference between the present attitude and the last received attitude B. This difference is compared to the "record new steady state A" limit E. Limit E is an attitude change threshold. Attitude changes that are less than this threshold, for example, will not cause the steady state attitude A and the present attitude B to be updated. Attitude changes that are greater than or equal to this threshold will cause these attitudes A and B to be updated. This limit E, thus prevents minor motion of the electronic device 110 from being recorded as a new steady state value A. In other words, the limit E prevents the trigger 109 from resetting the steady state value A due to slight or insignificant movements of the system 100 or the electronic device 110.

Thus, if the change in attitude exceeds E, the flowchart 1000 branches to step 1008 where the present attitude reading is stored as both the "steady state" attitude A and the "last received" attitude B. If the change in attitude does not exceed E, the flowchart branches to step 1009 where the trigger 109 calculates the difference between the present attitude and "steady state" attitude A. The trigger 109 then compares this difference to the "degrees from steady state" activation limit D, step 1010. If the difference exceeds D, the flowchart 1000 branches to step 304 of FIG. 3, and the system 100 activates the device 110. If the difference does not exceed D the flowchart branches to step 1011 to store the present attitude reading as B and then to step 1101 of FIG. 11 to check the position trigger 108. Thus, if the device 10 is not activated by the attitude trigger 109, the system 100 moves on to monitor the position trigger 108.

Figure 11:
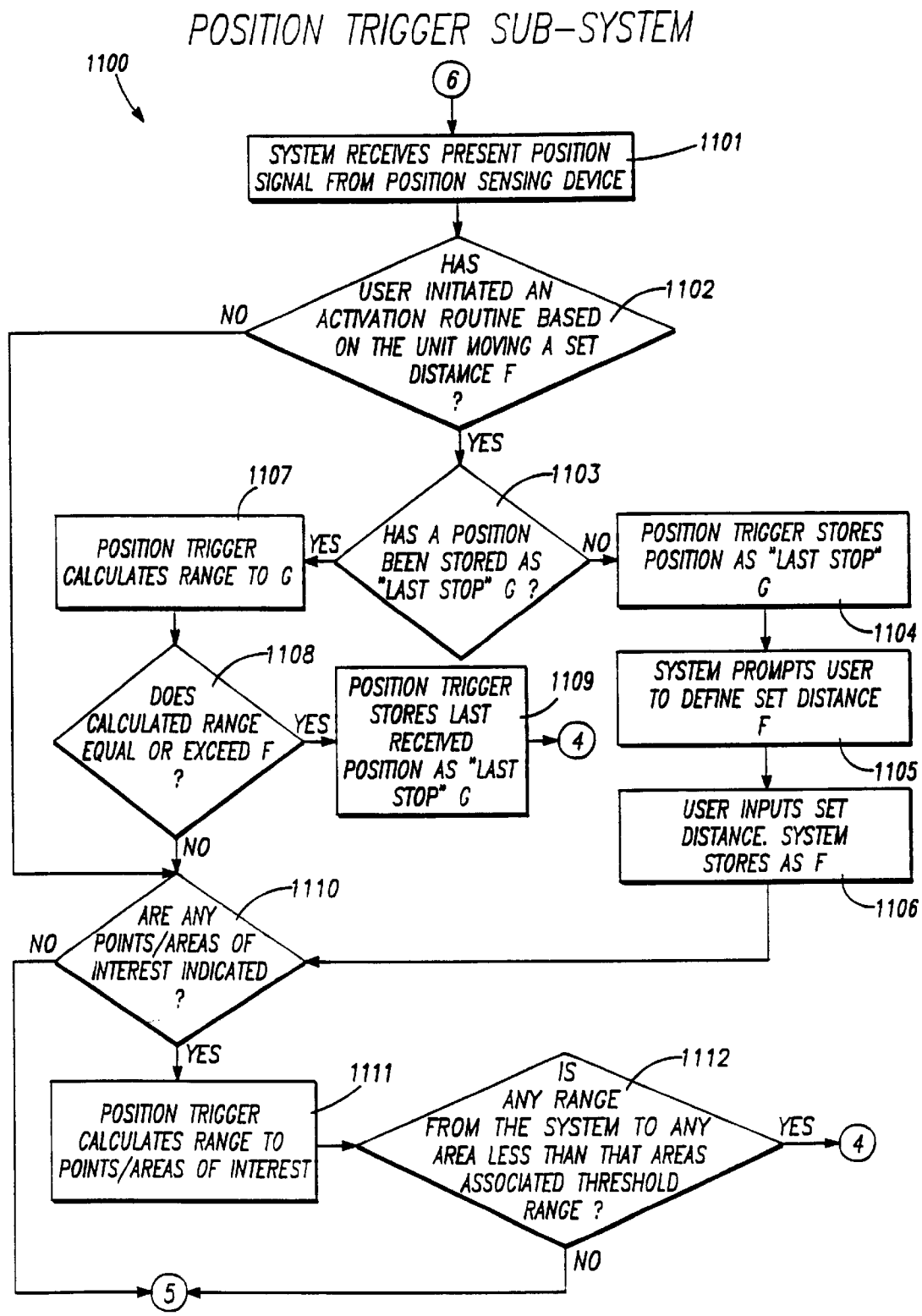
FIG. 11 illustrates the operation of a position trigger that can be used by embodiments of the invention.

FIG. 11 is a flowchart 1100 of the operation of the position trigger 108. The physical characteristics of the electronic device that are sensed by the position sensing device shall be referred to as position characteristics. The position trigger receives position information representing these position characteristics. This position information is obtained from a position signal that comes from the position sensing device. In the present embodiment, this operation is implemented using hardware to execute software. The hardware used to implement the position trigger is discussed with reference to FIG. 14. The flowchart 1100 illustrates the operation of the software. The position trigger executes position activation routines. The position trigger 108 checks to determine whether or not the position of the electronic device 110 has changed by a specified amount from its position at the time a position activation routine is activated. The position 108 also checks the proximity of the electronic device 110 to areas or points of interest specified by the user, for example. In step 1101 the position monitoring mode is activated and the position sensing device 104 transmits position information to the trigger 108. Steps 1102–1109 deal with position activation routines that activate the electronic device 110 or a portion of the electronic device 110 at user defined distances of movement or user defined positions. For example, the user can set the system 100 to activate the electronic device 110 every 50 feet. In step 1102, the trigger 108 determines if such an activation routine is active. If not, the flowchart 1100 branches to step 1110. If such a routine is active, the flowchart 1100 branches to step 1103 to determine if the active position activation routine has just been initiated. If the routine has just been initiated, the trigger 108 stores the present position of device 110 received in step 1101 as the "last stop" position G, step 1104, prompts the user to input the desired activation distance F, step 1105, and stores F, step 1106. If step 1103 determines that such an activation routine was already active, the trigger 108 calculates the distance from G to the present position, step 1107, and then compares this calculated distance to the user specified activation distance F, step 1108. If the calculated distance is greater than or equal to distance F, the flowchart 1100 branches to step 304 of FIG. 3 and the system 100 fully activates the device 110. If the calculated distance is less than F, the flowchart 1100 branches to step 1110. Alternate embodiments of the invention could work with position activation routines that handle a number of user specified distances. These distances could be used to provide a progressive power-up or power down of the device 110, for example. In particular, specified portions of the device 110 could be powered up or down at various distances to achieve a progressive power up or down of the device 110.

Steps 1110–1112 deal with proximity of device 110 to areas or points of interest that the user has specified. For example, a user may indicate that he or she wants the device 110 or a portion of the device 110 to activate when the device comes within a certain distance of a designated point or area. The user may desire that the device 110 become active when the device is within a half a mile of Auckland harbor outer marker R2, for example. In step 1110, the system 100 checks to see if a user has specified any points/areas of interest. If not, the flowchart 1100 branches to step 502 of FIG. 5 and returns to monitoring the time trigger 106. If the user has specified such points/areas of interest, the flowchart 1100 branches to step 1111 where the trigger 108 determines the distance to or from each such point/area. In step 1112, the trigger 108 compares the user specified activation distance associated with each point/area to the determined distance. If any of the determined distances are less than the associated activation distance, the flowchart 1100 branches to step 304 of FIG. 3 and the system 100 fully activates the device 110. If none of the determined distances are less than the associated activation distance, the flowchart 1100 branches to step 502 of FIG. 5 and the system 100 returns to monitoring the time trigger 106 as described above.

Figure 2:
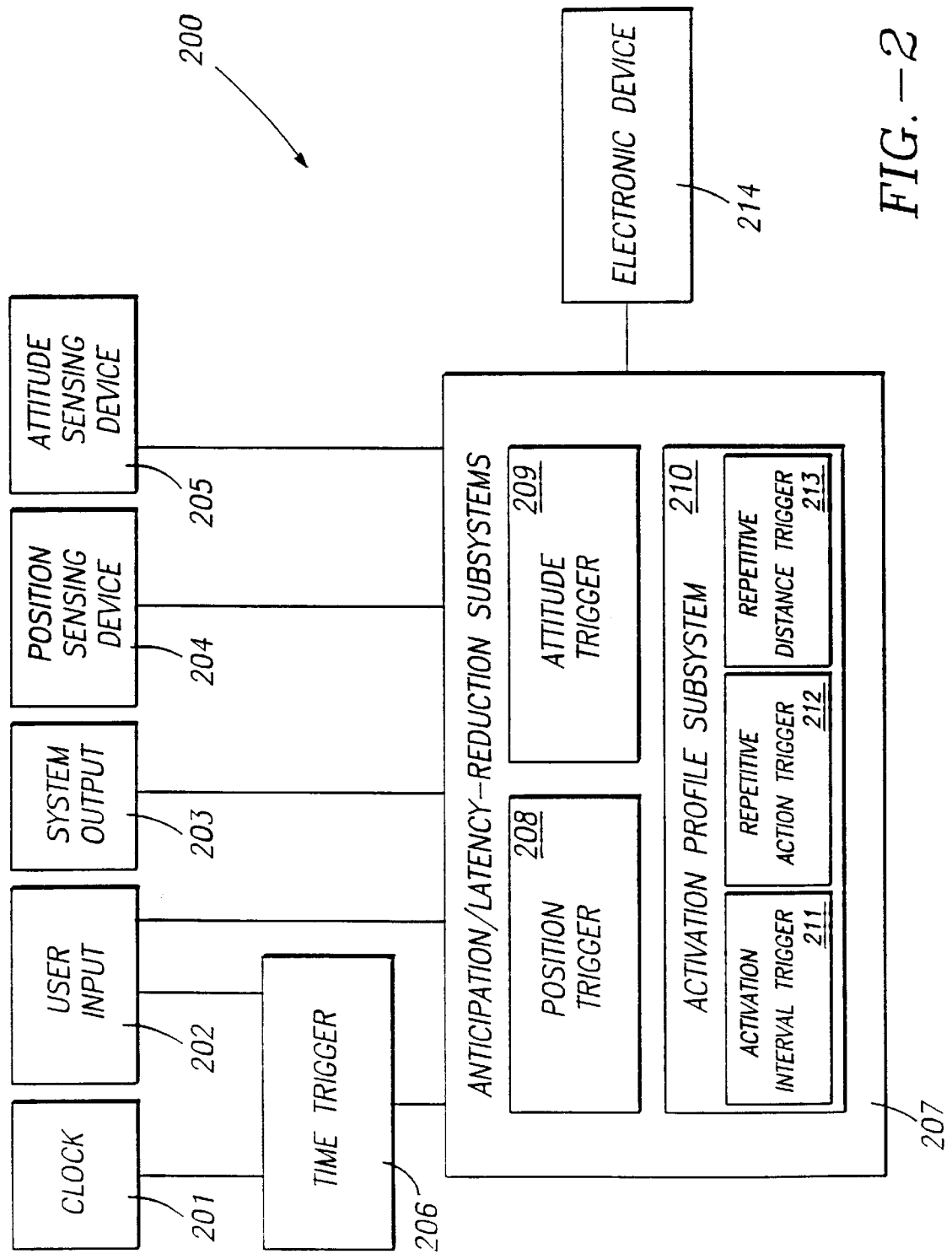
FIG. 2 illustrates a system 200 which is an alternate embodiment of the invention.

FIG. 2 is a block diagram of a system 200 that is a second embodiment of the invention. The system 200 includes components that operate in the same manner as those described with respect to the system 100. The similar components are numbered similarly (e.g. time trigger 206 operates in the same manner as time trigger 106). In addition to having such similar components, system 200 includes an activation profile subsystem 210. This subsystem 210 is included as part of the anticipation/latency-reduction subsystem 207 of system 200.

Subsystem 210 is designed to allow the system 200 to recognize, over a period of use, repetitive actions taken by a user or other repetitive conditions that occur prior to activation of device 110. Based upon this recognition, the subsystem 210 develops specific activation profiles that are associated with particular repetitive actions or particular repetitive conditions. These activation profiles allow the system 200 to recognize the particular repetitive actions or conditions as an indication of impending use. In response, the system 200 can activate or begin progressive activation of the device 214. The activation profile subsystem 210 includes an activation interval trigger (AIT) 211, a repetitive action trigger (RAT) 212, and a repetitive distance trigger (RDT) 213. Alternate embodiments of the invention may be designed to respond to repetitive conditions other than the specific repetitive conditions discussed herein.

Figure 4:
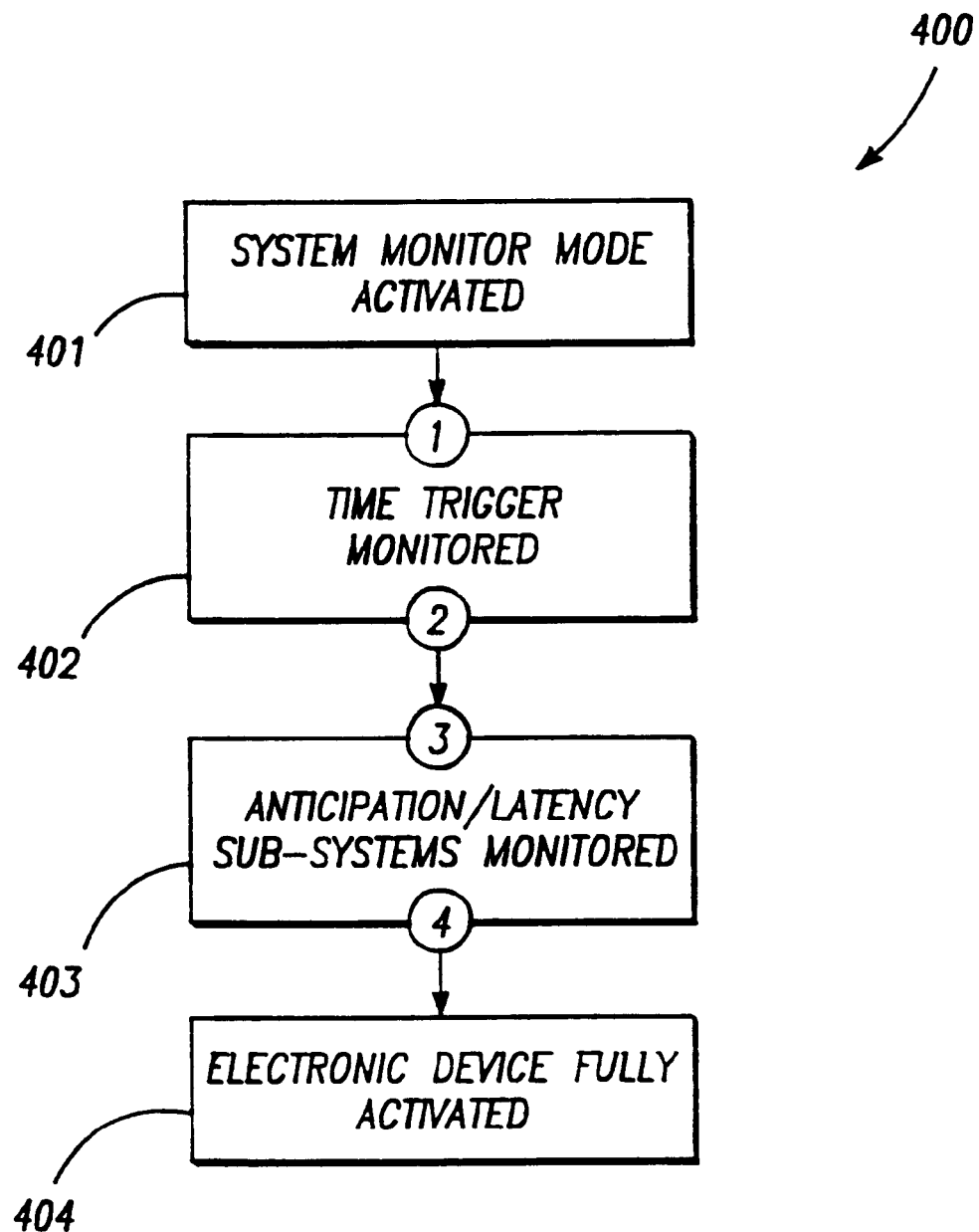
FIG. 4 illustrates the main flow of the operation of system 200.

FIG. 4 is a flowchart 400 that shows the general operation of the system 200. The operation is much the same as the operation of system 100 with some modifications. Step 401 is substantially the same as step 301. Step 402 is different than step 302. In particular, the flowchart 500 of FIG. 5 substantially describes the operation of step 402 of FIG. 4. At step 512 of flowchart 500, however, if Z is greater than or equal to W, the flowchart 500 in system 200 executes step 514 and then branches to step 601 of FIG. 6 rather than branching to step 1001 of FIG. 10. This modification is shown by the replacement of FIG. 3's flow chart connector 25 with FIG. 4's flow chart connector 3. Step 403 of FIG. 4 represents that operation of the Activation Profile subsystem 210 and the operation of the attitude trigger 208 and the position trigger 209. The operation of subsytem 210 is described in more detail below. As can be determined at the end of the activation profile flowcharts discussed below, the attitude and position triggers 209 and 208 operate in the same manner as the triggers 109 and 108, respectively, as was discussed above, except these triggers now operate after the activation profile subsystem 210. Accordingly, the operation of system 200 generally flows from FIG. 5 to FIG. 6 to FIG. 7 to FIG. 8 to FIG. 9 to FIG. 10 and then to FIG. 11, assuming the electronic device 214 is not activated during this flow. Once the operation in FIG. 11 is executed, the operation of system 200 loops back to step 502 of FIG. 5 through connector 5 of FIG. 11 assuming the electronic device 214 still has not been activated by the system 200. Thus, the system 200 may make multiple passes through these flowcharts before the device 214 is activated.

Figure 6:
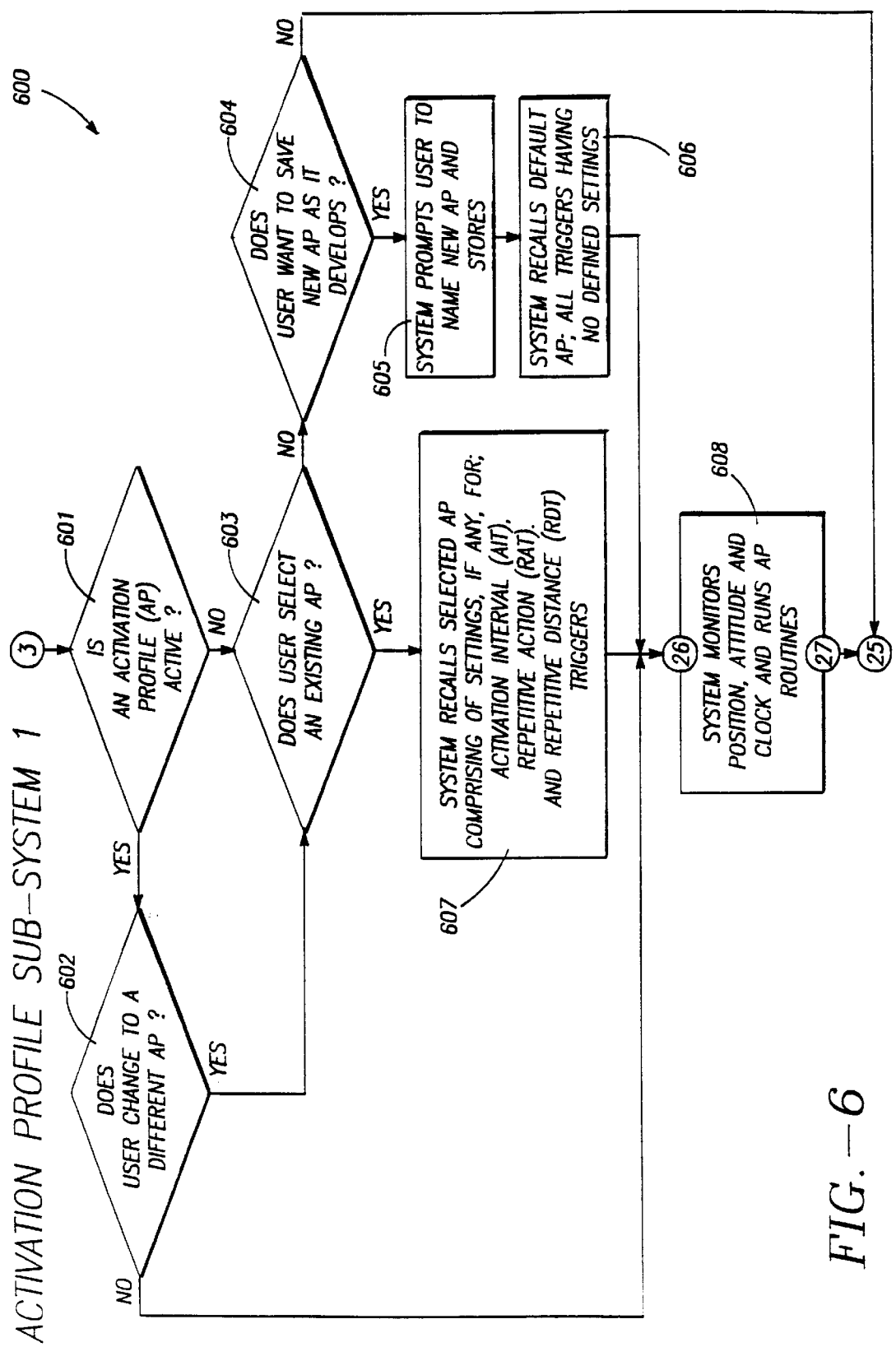
FIG. 6 illustrates the operation of an activation profile sub-system that can be used by embodiments of the invention.

After branching from step 514 of FIG. 5 to step 601 of FIG. 6, the system 200 checks the activation profile subsystem 210. The activation profile subsystem 210 can be implemented in the same manner as the triggers 106, 109 and 108, for example, using a processor or processors that execute software or other types of hardware. FIG. 6 is a flowchart 600 that shows the basic operation of the software of the activation profile subsystem 210. In step 601 the subsystem 210 checks to see if an activation profile (AP) is active. I.e. step 601 determines if the subsystem 210 has been instructed by a user or by some other device (e.g by a computer) to look for particular repetitive conditions. If so, the flowchart 600 branches to step 602. If in step 601 the subsystem 210 determines that an activation profile is not active, the flowchart 600 branches to step 603.

In step 602, the subsystem 210 ascertains whether the system 200 has been instructed to use a different AP than the one that is presently active. Again, such an instruction might come from a user of system 200 or from some other device. If in step 602 system 200 determines that it has been instructed to use a different AP, the flowchart 600 branches to step 603. If in step 602 the system 200 determines that it has not been instructed to use a different AP, the flowchart 600 branches to step 701 of the flowchart 700. The flowchart 700 illustrates the operation of the AIT 211.

In step 603 the system 200 ascertains whether a user, for example, has selected an existing AP. If so, the software of the subsystem 210 branches to step 607. Instep 607 the system 200 recalls the selected existing AP and provides the existing AP defined settings to each of the AP triggers 211, 212 and 213. As illustrated in step 607, an activation profile might use some or all of these triggers to sense conditions. As discussed below, each of these triggers senses different types of conditions. Alternate embodiments could use alternative triggers that sense other types of conditions. After entering the AP defined settings in the appropriate ones of the triggers 211, 212 and 213, the flowchart 600 branches to step 608 which is expanded in FIGS. 7–9.

If in step 603 system 200 determines that an existing AP has not been selected, the flowchart 600 branches to step 604. In step 604 the system 200 ascertains whether it should save a new AP as it develops. An example of how AP's might be developed is provided by the present embodiment which saves values in lists each time the system 200 passes through the AP subsystems 211, 212 and 213 as described below. Again, instruction to system 200 to save a new AP as it develops can come from a user of the system 200 or from some other device. If the system 200 has been instructed to save the new AP as it develops, the system 200 prompts the user to name the new AP, step 604. Upon receiving the name, the system 200 stores a default AP under that name, step 605, and the flowchart 600 then branches to FIG. 7 through connector 26. The default AP can be defined in any manner appropriate to the particular application of the system 200. In the present embodiment, the default AP has no defined settings for the triggers 211, 212 and 213. Step 608 represents the operation of the activation profile triggers 211, 212 and 213. This operation starts with FIG. 7. The operation of the triggers 211, 212 and 213 is described in more detail below.

Figure 7:
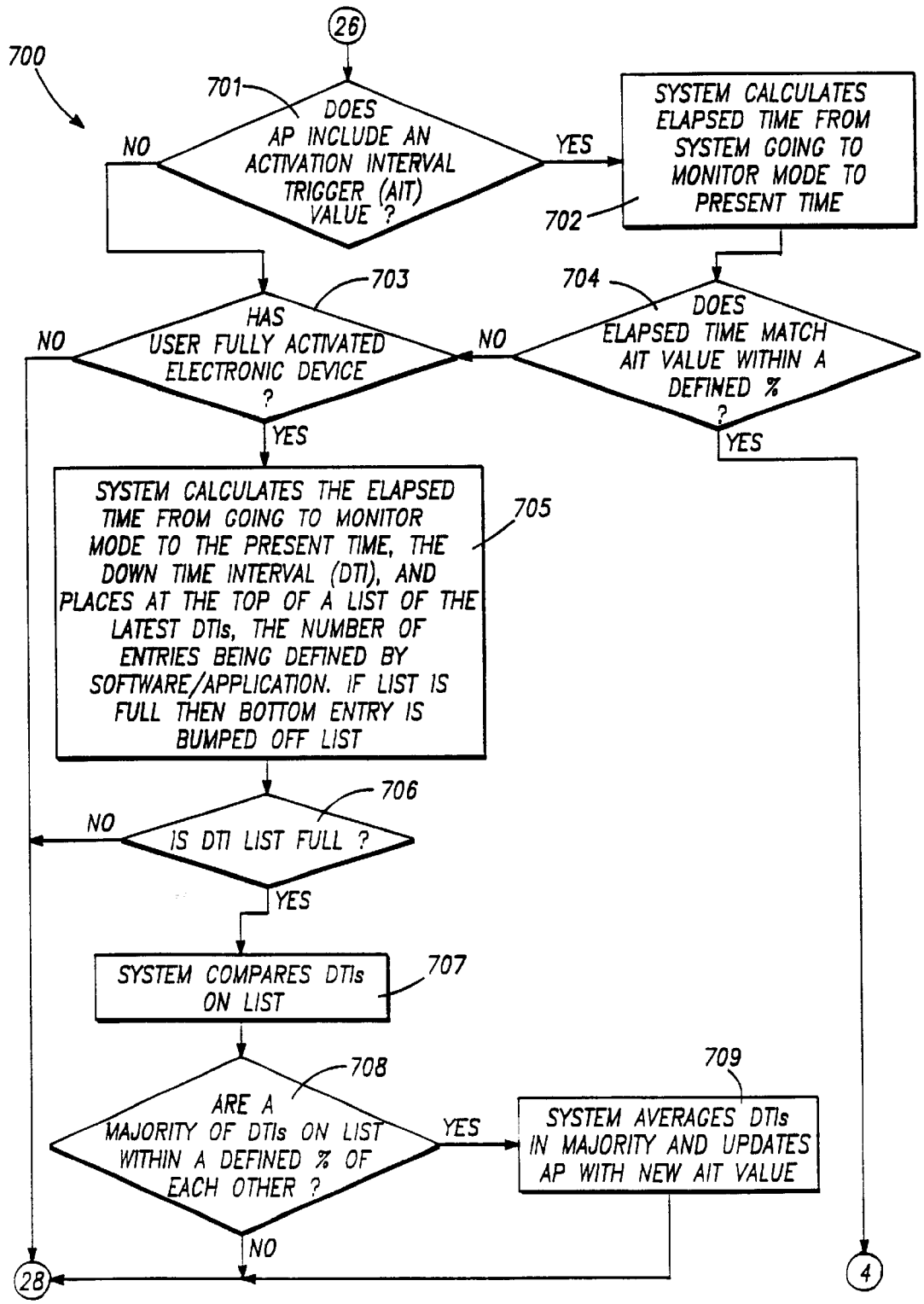
FIG. 7 illustrtates the operation of an activation interval trigger that can be used by embodiments of the invention.

FIG. 7 is a flowchart 700 that shows the operation of the activation interval trigger 211. The activation interval trigger 211 is implemented using hardware and software. The hardware is discussed with reference to FIG. 22 below. The flowchart 700 represents the operation of the AIT software in the present embodiment. Again, the activation interval trigger 211 is used by the activation profile subsystem to detect repetitive conditions. This particular trigger 211 is for detecting repetitive elapsed times from the time the system 210 entered the monitor mode in step 401 to the "present time" at which the device 214 is activated. Thus, the system 200 will "learn" to turn the electronic device 214 on at a particular time from the time the system 200 enters the monitor mode if the electronic device 214 is previously repeatedly turned on at substantially the same time (within a predefined tolerance) of the time when the system 200 enters the monitor mode. While the present embodiment discusses "activation" of the electronic device, alternate embodiments could deal with deactivation. Accordingly, the AIT trigger and the activation interval value refer herein to such intervals whether the device 214 is being powered up or powered down.

In step 701, the AIT 211 ascertains whether or not an AIT interval value for the AIT 211 has been stored. If an interval value has been stored, the flowchart 700 branches to step 702. If an interval value for the AIT has not been stored, the flowchart 700 branches from step 701 to step 703. In step 702, the AIT 211 calculates the elapsed time from the time the system 200 entered the monitor mode to a "present time" where the present time is the time that was most recently read in step 502. This elapsed time shall be referred to as an observed activation interval value. Again, the monitor mode is activated in step 401. From step 702, the operation branches to step 704.

In step 704, the AIT 211 compares the elapsed time calculated in step 702 to the AIT interval value. If the elapsed time "matches" the AIT interval value, the flowchart 700 branches to step 404 of FIG. 4 and the system 200 fully activates the device 214. An elapsed time "matches" the AIT interval value when it is equal to or within some predefined range of the interval value. If the elapsed time does not match the AIT interval value, the flowchart 700 branches to step 703. As described below, this AIT interval can be a "learned" value.

In step 703 the AIT 211 ascertains whether the device 214 has already been activated (by the system 200 itself, by a user or by some other device). If the device 214 has not been activated, the operation as represented by flowchart 700 branches to step 801 of FIG. 8 to check the repetitive action trigger 212. If in step 703 the device 214 has been activated, the flowchart 700 branches to step 705. In step 705 the AIT 211 calculates the mode change time interval (MCTI) which is the time that has elapsed from the time the system 200 entered the monitor mode to the present time at which the trigger 212 detected that the electronic device 214 has been activated. In system 200 the electronic device 214 initially is powered off and then is powered up by the system 200. In an alternate embodiment, the device 214 may initially be powered on and then the system 200 may power down the device. Thus, the MCTI may refer to the time that has elapsed from the time the system 200 entered the monitor mode until the electronic device 214 is deactivated. If the system 200 is switching the device 214 from an off mode to an on mode, the MCTI may be referred to as a down time interval (DTI). If the system 200 is switching the device 214 from an on mode to an off mode, the MCTI may be referred to as a up time interval (UTI). The system 200 and the AIT 211 is described below in terms of down time intervals.

The AIT 211 maintains a list of DTI's. Again, each DTI is generated by one pass of the AIT 211 through the flowchart 700. The AIT 211 tracks the number of DTI's using a list. Each newly calculated DTI is placed at the top of this list of DTIs. The number of entries in this list is typically defined according to the needs of the particular application. For example, if the application is for a high motion environment, such as in an airplane, the number of DTI entries might be quite large. Under such circumstances the user may turn on the system 200 to activate the electronic device 214 a large number of times. A number of DTI entries may be generated as follows. After the time that the system 200 is turned on and the system 200 turns on the electronic device 214, the electronic device 214 might be turned off by the user, the system 200 itself or by some other electronic device. The system 200 would be turned off in response to the electronic device 214 turning off. After this point, the user might turn the system 200 back on, and another pass might be made through the flowchart 700, adding a second entry to the DTI list. If the DTI list becomes full, each newly calculated DTI is placed in the list (e.g. at the top of the list) and the oldest DTI is bumped off of the list (e.g. off the bottom of the list) for each new DTI added. Alternative approaches can be used to store relevant DTI's.

In step 706 the system 200 checks to see if the DTI list is full. If not, the flowchart 700 branches to step 801 of the flowchart 800 shown in FIG. 8. In step 801, the system 200 proceeds to update the other AP triggers (i.e. the RAT 212 and the RDT 213) if appropriate. If in step 706 the system 200 determines that the DTI list is full, the flowchart 700 branches to step 707. In step 707, the system 200 compares each of the entries in the DTI list to determine whether or not a majority of the DTIs are within the predefined tolerance limit of each other, step 708. This comparison can be accomplished in any manner that identifies a majority group of DTI's that are relatively close to each other (i.e. within the predefined tolerance of each other). Again, the predefined tolerance limit can be chosen as appropriate for the particular application. One approach determining whether a majority of DTI's are within a predefined tolerance of each other would be to determine the mean of all the entries in the DTI list. Each of the DTI's could then be compared to this mean. If a majority of the DTIs are within the predefined tolerance of the mean, the flowchart 700 branches to step 709 where the DTIs in this majority are averaged. Again, other approaches, including more sophisticated approaches, could be used to perform this identification of an appropriate majority. The average value of the DTI's in the identified majority is saved as a new AIT interval value for the AIT 211. From step 709, the flowchart 700 then branches to step 801 of FIG. 8 to proceed to update the other AP triggers if appropriate. If in step 707 the system 200 determines that a majority of the DTIs are not within the predefined tolerance of each other, the flowchart 700 branches to step 801 of FIG. 8 to proceed to update the other AP triggers if appropriate.

Figure 8:
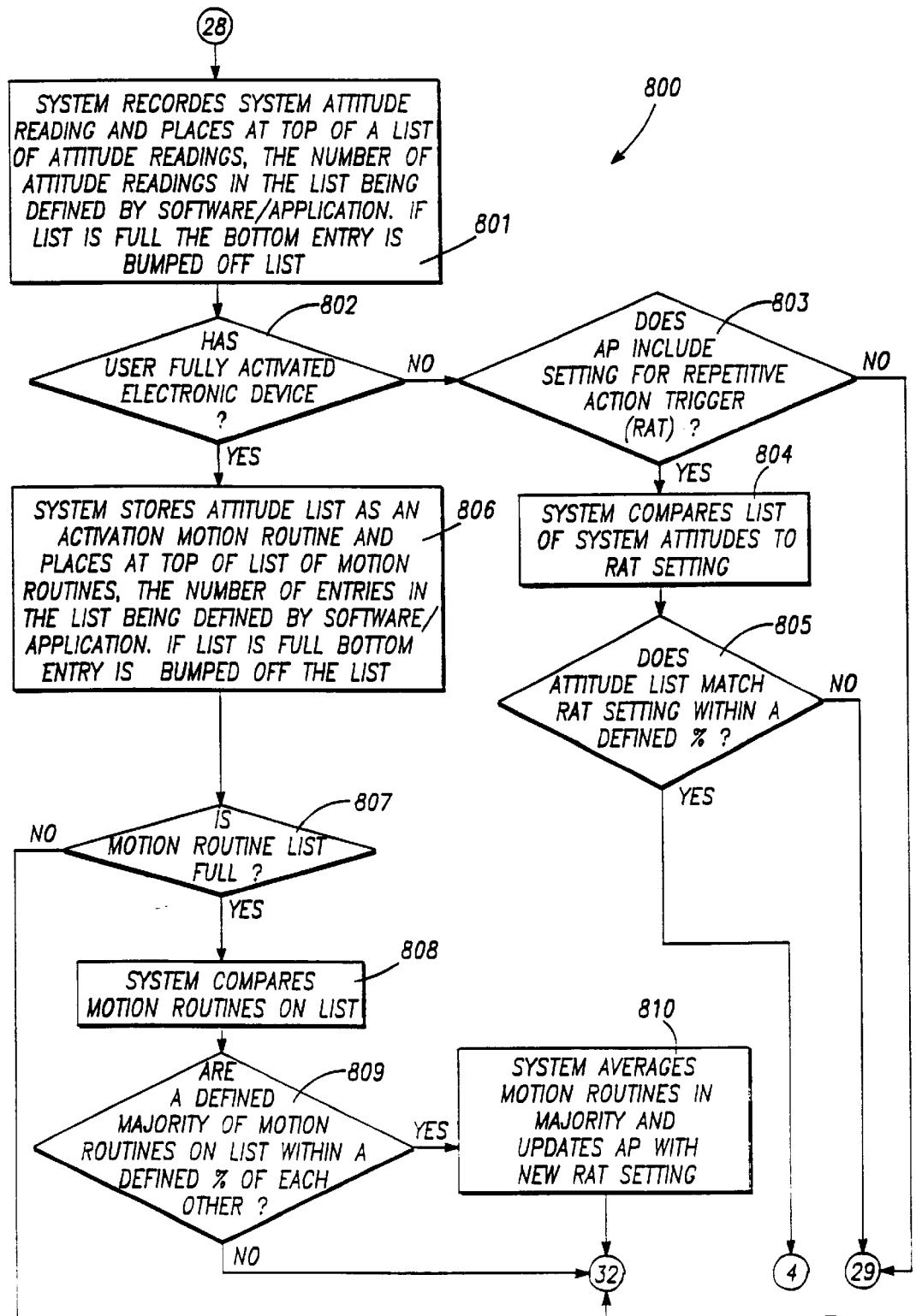
FIG. 8 illustrates the operation of a repetitive action trigger that can be used by embodiments of the invention.

FIG. 8 is a flowchart 800 that shows the operation of the repetitive action trigger (RAT) 212. In the present embodiment, this operation is implemented by executing software using hardware. The flowchart 800 represents the operation of the software. The hardware used by the RAT 212 is described with reference to FIG. 23 below. The repetitive action trigger looks for a repetitive series of attitudes. Each attitude reading might be expressed as an (x,y,z) coordinate where x represents an attitude rotation around a vertical axis, y represents an attitude rotation around a horizontal axis and z represents an attitude rotation around an axis perpendicular to both the x and y axes. Thus, for example the electronic device 214 might move through the series of attitudes $$[(0°,0°, 0°), (20°, 20°, 0°), (45°,45°, 0°), (90°, 90°, 0°), (90°, 120°, 0°), (90°, 130°, 0°)] \quad (1)$$

before the device 214 is activated. If it moves through this series of attitudes (within predefined tolerances) regularly before the device 214 is activated, the system 200 can learn the series of attitudes. Then the system 200 can activate the device 214 upon detecting the learned series.

In step 801, the RAT 212 records an attitude reading (e.g. an x,y,z coordinate) from the attitude sensing device 205 and places the recorded attitude at the top of a list of attitude readings. The number of (x,y,z) attitude readings in this attitude list again is typically defined by the requirements of the particular application. Attitude readings are added to this attitude list until it is full. Again, each pass through the flowchart 800 generates a single (x,y,z) attitude reading that is added to the list. Once the attitude list is full, each newly recorded attitude reading is placed at the top of the list and for each new reading added, the oldest attitude reading is bumped off the bottom of the list. In step 802 the RAT 212 ascertains whether or not the device 214 has been activated. It may have been activated by a user, by the system 200 itself or by some other device. If the device 214 has been activated, the flowchart 800 branches to step 806. If the device 214 has not been activated, the flowchart 800 branches to step 803.

In step 803, the RAT 212 checks to see if a RAT attitude setting for the repetitive action trigger (RAT) 212 has been stored. If a RAT attitude setting has been stored, the flowchart 800 branches to step 804. If such a setting has not been stored, the flowchart 800 branches to step 901 of FIG. 9 to check the repetitive distance trigger 213. As discussed below, the RAT attitude setting could be a learned setting. The RAT attitude setting is actually a series of attitude readings (such as the series (1) shown above) for which the system 200 is looking.

In step 804 of flowchart 800, the RAT 212 compares each of the entries in the list of attitude readings (i.e. the observed attitude readings) with the corresponding attitudes in the RAT attitude setting. For example, it compares the first observed attitude with the first attitude in the RAT setting, the second observed attitude with the second attitude in the RAT setting, and so on. The RAT attitude setting list may include one or more attitudes. In step 805 the RAT 212 ascertains whether each of the attitude readings in the attitude list matches the corresponding RAT attitude setting within a predefined tolerance. Again, a match occurs when the observed attitude reading is within a predefined tolerance of the corresponding attitude in the RAT attitude setting list. Again, the predefined tolerance can be determined according to the requirements of the particular application. If each of the corresponding attitudes in the two lists match within the predefined tolerance, the system 200 has determined that the electronic device 214 has moved through the searched for series of attitudes as defined by the RAT attitude setting. As a result, the flowchart 800 branches to step 404 of FIG. 4 and the system 200 fully activates the device 214. If the two lists do not match within the predefined tolerance, then the flowchart 800 branches to step 901 of FIG. 9 and the system 200 checks the repetitive distance trigger 213.

If in step 802 the RAT 212 branched to step 806, in step 806 the RAT 212 "learns" the attitude series that occurred before the device 214 was turned on. In particular, the series of attitudes that occurred before the device 214 turned on is added to an activation motion routine (AMR) list. By moving through the flowchart 800 multiple times, multiple attitude series are added to the AMR list. Thus, the activation motion routine list is a list of lists or a list of "attitude series." In particular, each entry in the AMR list is itself a list of attitudes. The RAT 212 stores the attitude list from step 801 as an activation motion routine. The RAT 212 then places this AMR at the top of a list of AMRs. The number of entries in this AMR list is typically defined according to the requirements of the particular application. Each new AMR is added to the top of the AMR list. If the list is full, for each new AMR is added, the oldest AMR is bumped from the bottom of the list.

In step 807, the RAT 212 tests to ascertain whether or not the AMR list is in fact full. If it is not, the flowchart 800 branches to step 905 of the flowchart 900 of FIG. 9 to update the repetitive distance trigger setting if appropriate. If the AMR list is full, the flowchart 800 branches to steps 808 and 809. In steps 808 and 809, the RAT 212 compares the AMR's in the list and ascertains whether a majority of the AMRs are within an predefined tolerance of each other. One approach to doing this is to determine the mean of the corresponding attitude readings in all of the lists that make up the AMR. For example, the RAT 212 may calculate the mean of all of the first attitude readings in the lists that make up the AMR; then the mean of all the second attitude readings in the list that makes up the AMR; and so on. Upon calculating such a "mean attitude list," the RAT 212 compares each of the attitude readings in each entry of the AMR list to the corresponding attitude readings in the mean attitude list. If all of the attitude readings of a particular AMR entry are within a predetermined tolerance of the corresponding mean attitude from the mean attitude list, then the particular AMR is included in a group. If a majority of AMR's are included in this group, then the flowchart 800 branches from step 809 to step 810 where the corresponding attitude readings in each of the AMR entries in the majority are averaged and this list of average attitudes is saved as a new RAT attitude setting. Other techniques can be used to determine which of the AMR's are within a predefined tolerance of each other. From step 810 the flowchart branches to step 905 of FIG. 9 to update the repetitive distance trigger setting if necessary. In step 809, if a majority of the AMRs are not within the predefined tolerance of each other, the flowchart 800 branches to step 905 of FIG. 9 to update the repetitive distance trigger setting if appropriate.

Figure 9:
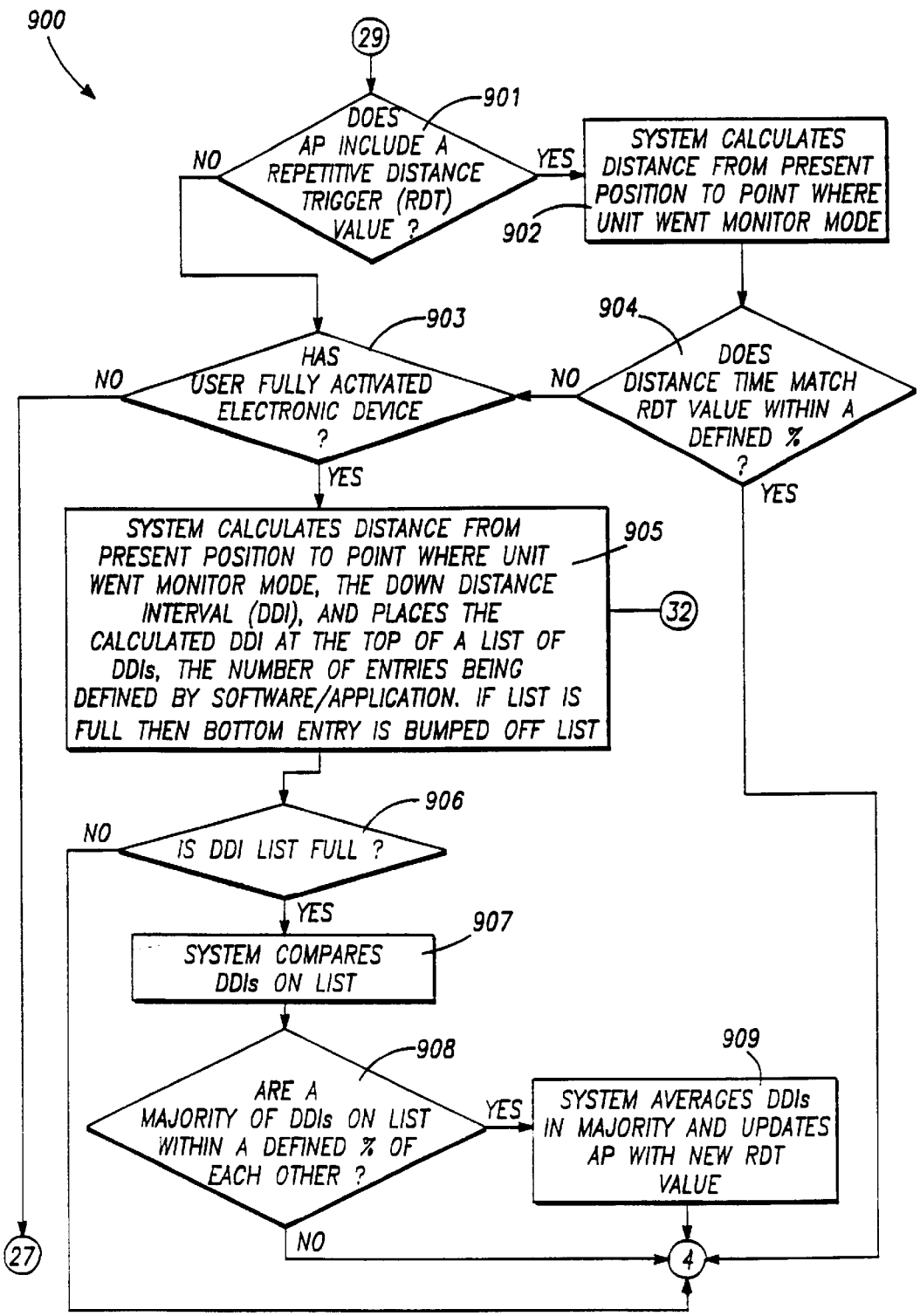
FIG. 9 illustrates the operation of a repetitive distance trigger that can be used by embodiment of the invention.

FIG. 9 is a flowchart 900 that shows the operation of the repetitive distance trigger 213. In the present embodiment, this operation is implemented by executing software using hardware. The flowchart 900 represents the operation of the software. The hardware used by the RDT 213 is described with reference to FIG. 24 below. The repetitive distance trigger 213 monitors repetitive distances from the position of the electronic device 214 when the system 200 enters the monitor mode to the position of the electronic device 214 when the electronic device is turned on. The system 200 will "learn" to turn on at this same distance from this position of the electronic device 214 when the electronic device 214 entered the monitor mode.

In step 901 of flowchart 900, the RDT 213 ascertains whether a repetitive distance value for the repetitive distance trigger (RDT) has been stored in an application profile (AP). This repetitive distance value can be a learned value as described below. If a repetitive distance value has been stored, the flowchart 900 branches to step 902. If a repetitive distance value has not been stored, the flowchart 900 branches to step 903. In step 902 the RDT 213 calculates the distance from the present position of electronic device 214 to the position of electronic device 214 at the time the monitor mode was activated. This distance shall be referred to as an observed distance value. The flowchart 900 then branches from step 902 to step 904. In step 904 the RDT 213 compares the distance calculated in step 902 to the repetitive distance value. If the calculated distance "matches" the repetitive distance value, the flowchart 900 branches from step 904 to step 404 of FIG. 4 and the system 200 fully activates the device 214. A match occurs if the calculated distance falls within a specified range of the repetitive distance value. If the calculated distance does not match the repetitive distance value, the flowchart 900 branches to step 903. In step 903 the RDT 213 ascertains whether or not the device 214 has been activated. If the device 214 has not been activated, the flowchart 900 branches to step 1001 of FIG. 10 to proceed with checking the attitude trigger 209 and position trigger 208. This branch is shown by the connector 27 from FIG. 9 to FIG. 6 and the connector 25 from FIG. 6 to FIG. 10. The operation of triggers 209 and 208 are the same as the operation of the triggers 109 and 108, respectively, which have been described with reference to the system 100.

If in step 903 the device 214 has been activated, the flowchart 900 branches from step 903 to step 905. In step 905 the RDT 213 calculates the distance from the present position of electronic device 214 to the position of electronic device 214 at which monitor mode was activated. This distance shall be referred to as the mode change distance interval (MCDI). The mode change distance interval (MCDI) is the distance that the electronic device 214 has moved from the time the system 200 entered the monitor mode to the present time at which the trigger 213 detected that the electronic device 214 has been activated. Similar to the MCTI of the AIT 211, the MCDI can refer to a change of the device 214 from a powered down mode to a powered up mode (i.e. activation), as in the present embodiment. Such a MCDI can also be referred to as a down distance interval (DDI). Similarly, the MCDI can refer to a change of the device 214 from a powered up mode to a powered down mode. Such an MCDI can also be referred to as a up distance interval (UDI). The system 200 is described below in terms of down distance intervals.

Each pass through the flowchart 900 calculates a single DDI. The trigger 213 places the DDI calculated in step 905 at the top of a list of DDIs. The number of entries in this list of DDI's can be defined according to the requirements of each particular application. If the DDI list is full, the newly calculated DDI is placed at the top of the list and the oldest DDI is bumped off the bottom of the list. Alternate techniques can be used to store relevant DDI values. The trigger 213 branches from step 905 to step 906. In step 906 the system 200 ascertains whether or not the DDI list is full. If it is not full, the flowchart 900 branches to step 404 of FIG. 4 and the system 200 fully activates the device 214. After the device 214 is activated by the system 200, the device 214 may be turned off by the user, by the system 200 itself or by some other electronic device. Turning the system 200 back on after this point will generate a second DDI that will be added to the list of DDI's. If the DDI list is full, the flowchart 900 branches to step 907.

In step 907 the RDT 213 compares the entries in the DDI list to each other and branches to step 908. In step 908 the RDT 213 ascertains whether a majority of the DDIs are within the predefined tolerance of each other. This comparison can be accomplished in any manner that identifies a majority group of DDI's that are relatively close to each other (i.e. within the predefined tolerance of each other). Again, the predefined tolerance limit can be chosen as appropriate for the particular application. One approach determining whether a majority of DDI's are within a predefined tolerance of each other would be to determine the mean of all the entries in the DDI list. Each of the observed DDI's could then be compared to this mean. If a majority of the DDIs are within the predefined tolerance of the mean, the flowchart 900 branches to step 909 where the DDIs in this majority are averaged. Again, other approaches, including more sophisticated approaches, could be used to perform this identification of an appropriate majority.

If a majority of the DDIs are within the predefined tolerance of each other, the system 200 has identified a pattern of device 214 activations where the device 214 has been activated repeatedly at about the same distance from the position of the device 214 when the system 200 entered the monitor mode. If the majority are within this predefined tolerance, the flowchart 900 branches to step 909 where the DDIs in the majority are averaged. This average value is saved as a new value for the repetitive distance value. This step is where the system 200 "learns" the repetitive distance for which it is looking. From step 909 flowchart 900 branches to step 401 of FIG. 4 and the system 200 fully activates the device 214. If in step 908 a majority of the DDIs are not within the predefined tolerance off the repetitive distance value, the flowchart 900 branches to step 401 of FIG. 4 and the system 200 fully activates the device 214.

Figure 15:
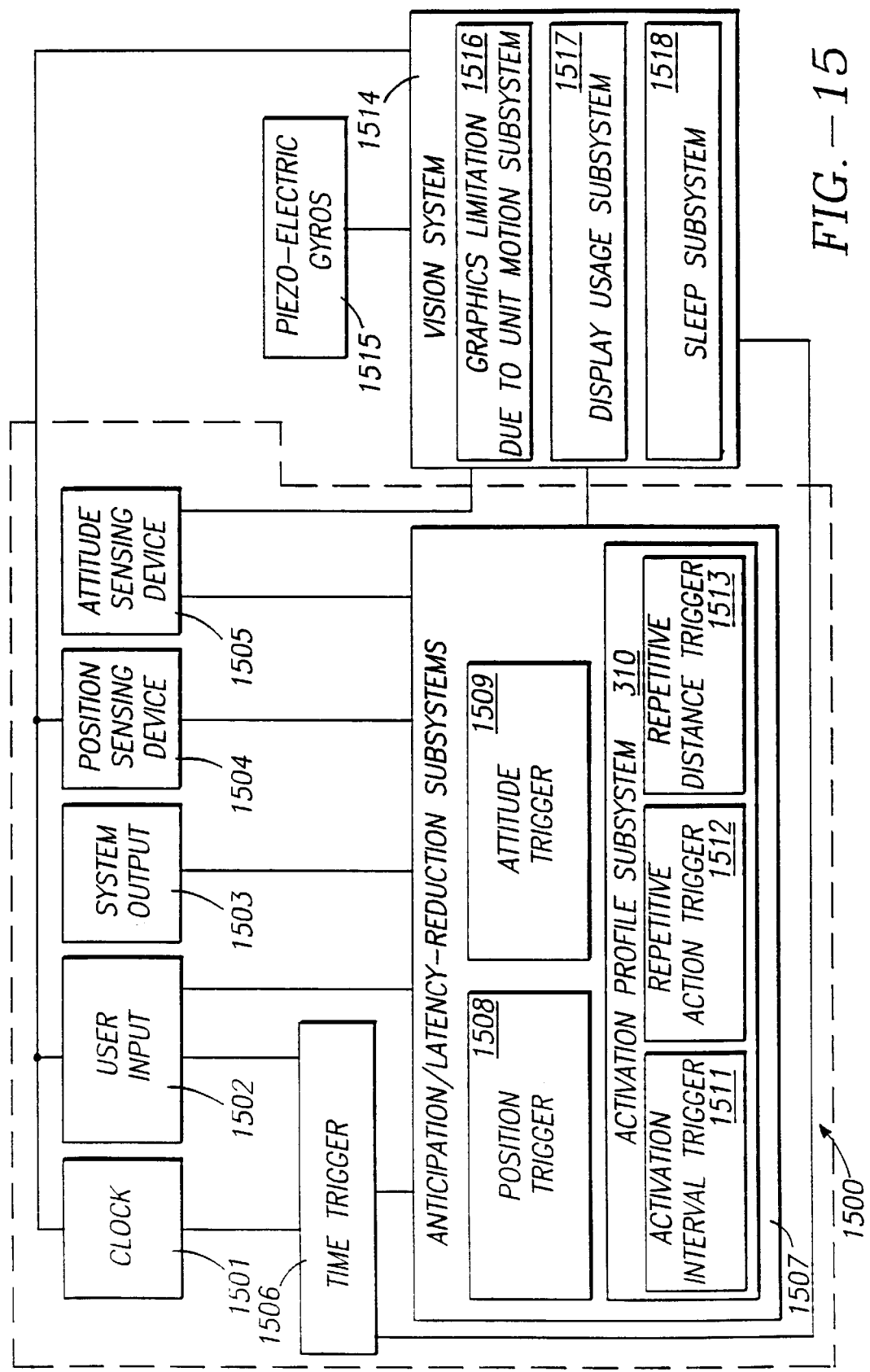
FIG. 15 illustrates system 1500 which is an alternate embodiment of the invention.

FIG. 15 illustrates a system 1500 that is coupled to a vision system 1514. This system 1500 illustrates an embodiment of the invention that is being used to control the vision system 1514. The vision system 1514 is a particular example of an electronic device such as the device 214. The vision system 1514 could be a traditional optical combiner type of instrument, such as a heads up display, or preferably a vision system of the type as disclosed in the PCT publication no. WO 95/07526. This published PCT application entitled "Electro-Optic Vision Systems Which Exploit Position and Attitude" having publication no. WO 95/07526 having international filing date Jun. 16, 1994, Applicant Criticom Corp., having inventors John Ellenby and Thomas William Ellenby, and having International application no. PCT/US94/06844 is hereby incorporated herein by this reference. The systems 1500 and 1514 are also used to illustrate additional concepts that relate to the reduction of graphics complexity when motion of the electrical device being controlled is detected. These systems are used to illustrate concepts that relate to the activation or deactivation of system displays based upon detected user proximity and concepts that relate to the conservation of power when system inactivity is detected, among others.

In FIG. 15, the components of system 1500 operate in the same manner as the similarly numbered components of system 200 of FIG. 2. The vision system 1514 includes a graphics limitation due to unit motion subsystem 1516, a display usage subsystem 1517, and a sleep subsystem 1518 and a display, such as a video monitor or a heads up display (not shown). The vision system 1514 also includes a piezo-electric gyro system 1515. This gyro system 1515 is associated with the image stabilization system (not shown) of the vision system 1514. An example of an image stabilization, such as a deformable prism image stabilization system that uses piezo-electronic gyros, is disclosed in International Publication No. WO 95/07526 having an international publication date of Mar. 16, 1995 and having the Applicant Criticom Corporation. The systems of FIG. 15 can be used to implement a system such as the one described in this Publication WO 95/07526. In particular, the present embodiment may be used in a system where information about the real world position and/or attitude, for example, of graphical objects has been previously stored in some manner. Such data may represent something in the real world such as a real world objects, locations or area(s), for example. The graphical objects may or may not, however, be associated with these real world items. This stored information can then be provided to the system 1514. Based upon the position and/or attitude of the vision system 1514 and based upon the field of view of its imaging device, the system 1514 can recall the stored graphical objects and superimpose them, in the correct location, on a real time image of a particular view being observed by a user. The imaging device might be a camera (e.g a digital camera) with appropriate lenses.

The outputs of the clock 1501 and user input 1502 are coupled to the time trigger 1506. The outputs of the time trigger 1506, user input 1502, position sensing device 1504, and attitude sensing device 1505 are coupled to the anticipation/latency-reduction subsystems 1507, and hence to the position trigger 1508, attitude trigger 1509, activation interval trigger 1511, repetitive action trigger 1512, and the repetitive distance trigger 1513. The outputs of the anticipation/latency-reduction subsystems 1507, clock 1501, user input 1502, position sensing device 1504, attitude sensing device 1505, time trigger 1506, and piezo-electric gyros 1515 are coupled to the vision system 1514, and hence to the graphics limitation due to unit motion subsystem 1516, the display usage subsystem 1517, and the sleep subsystem 1518.

Figure 16:
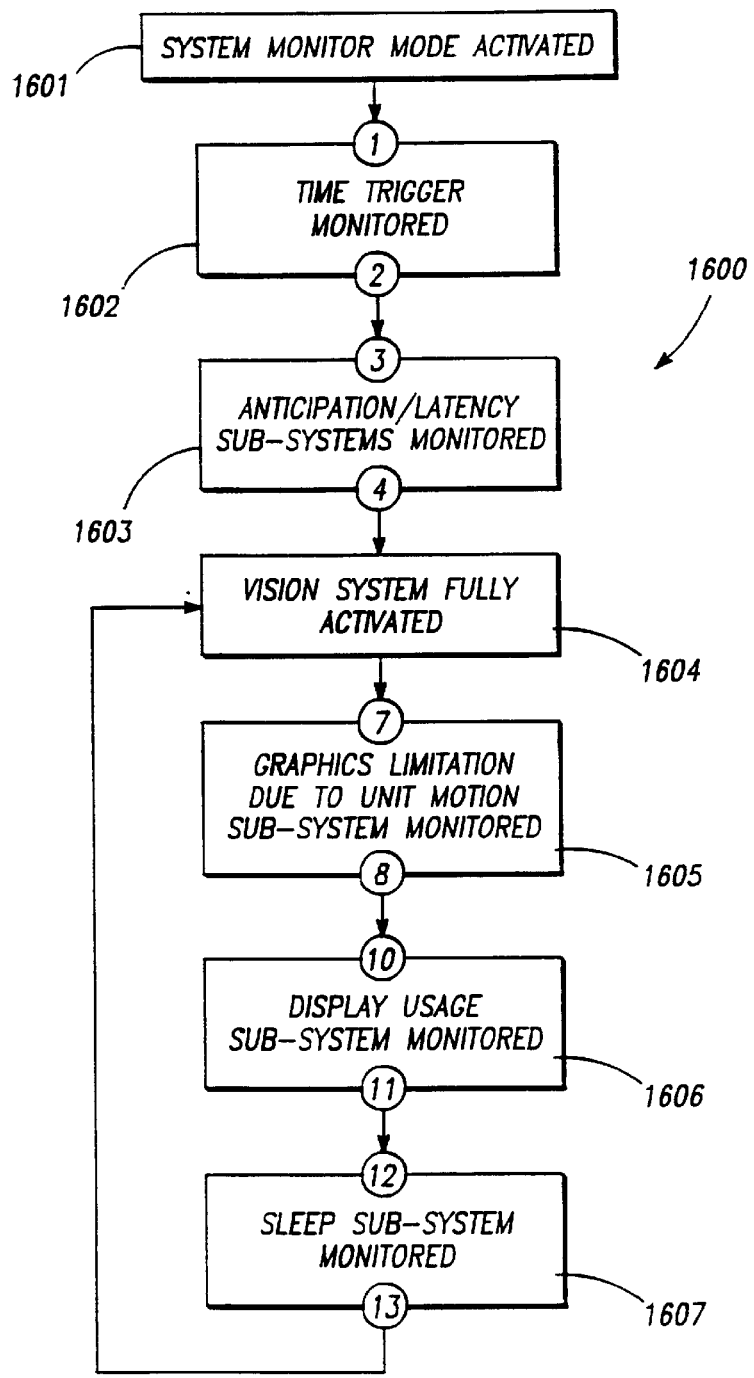
FIG. 16 illustrates the main flow of operation of the system 1500.

FIG. 16 is a flowchart 1600 that shows the general operation of the system 1500. In step 1601 the user activates the monitor mode, telling the system 1500 to monitor the time trigger 1506 and the anticipation/latency reduction subsystems 1507. The flowchart 1600 then branches to step 1602, in which the system 1500 monitors the time trigger 1506 for a time specified by the monitor limit W, and then branches to step 1603. In step 1603 the system 1500 monitors the anticipation/latency-reduction subsystems 1507. The flowchart 1600 then branches to step 1604, in which the vision system 1514 is activated, and then branches to step 1605. In step 1605 the system 1500 monitors the graphics limitation due to unit motion subsystem 1516 of the vision system 1514. The flowchart 1600 branches from step 1605 to step 1606 where the system 1500 monitors the display usage subsystem 1517 of the vision system 1514. The flowchart then branches to step 1607 where the system 1500 monitors the sleep subsystem 1518 of the vision system 1514.

Figure 17:
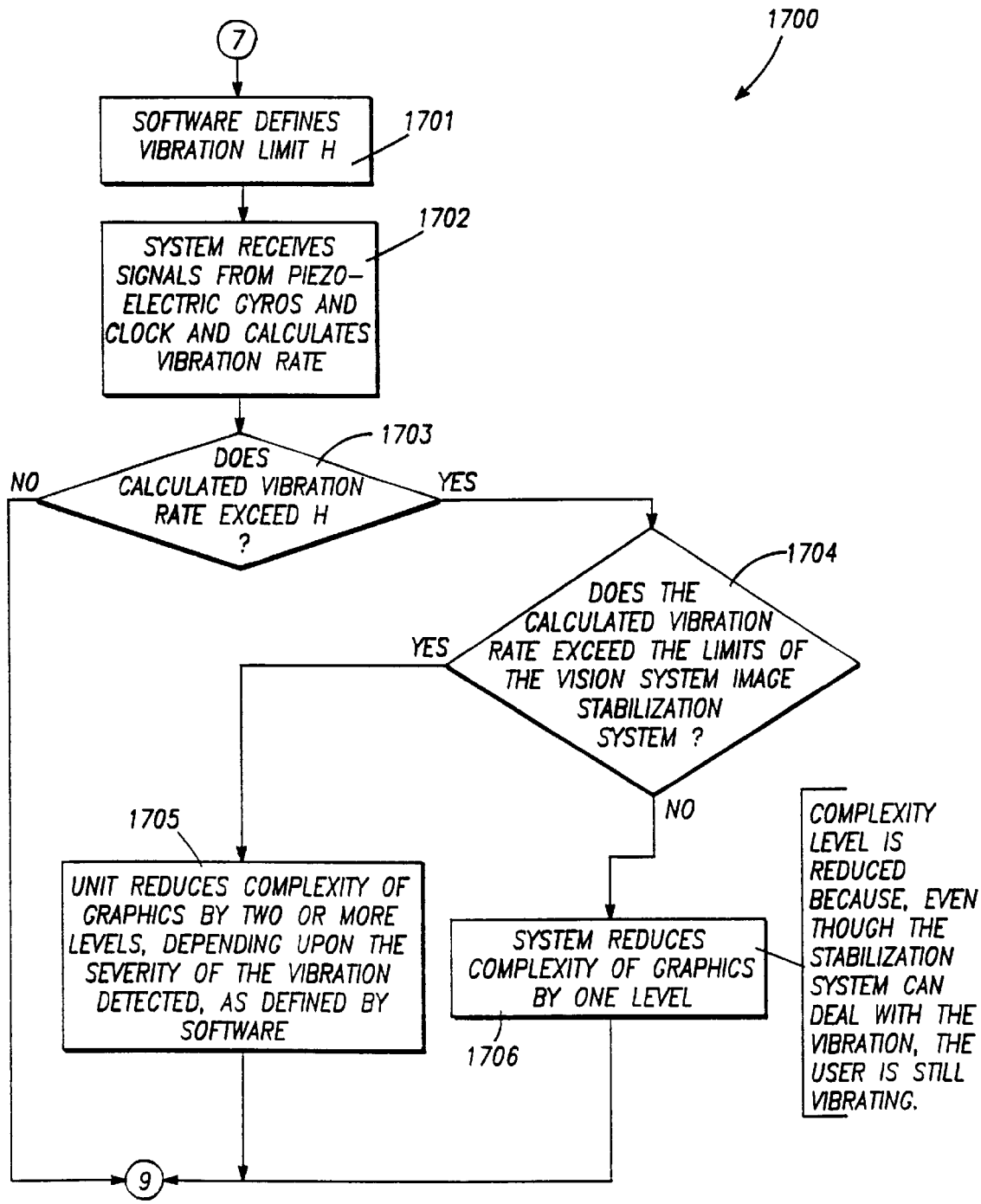
FIGS. 17 and 18 illustrate the operation of a Graphics Limitation Due to Unit Motion sub-system that can be used by embodiments of the invention.
Figure 18:
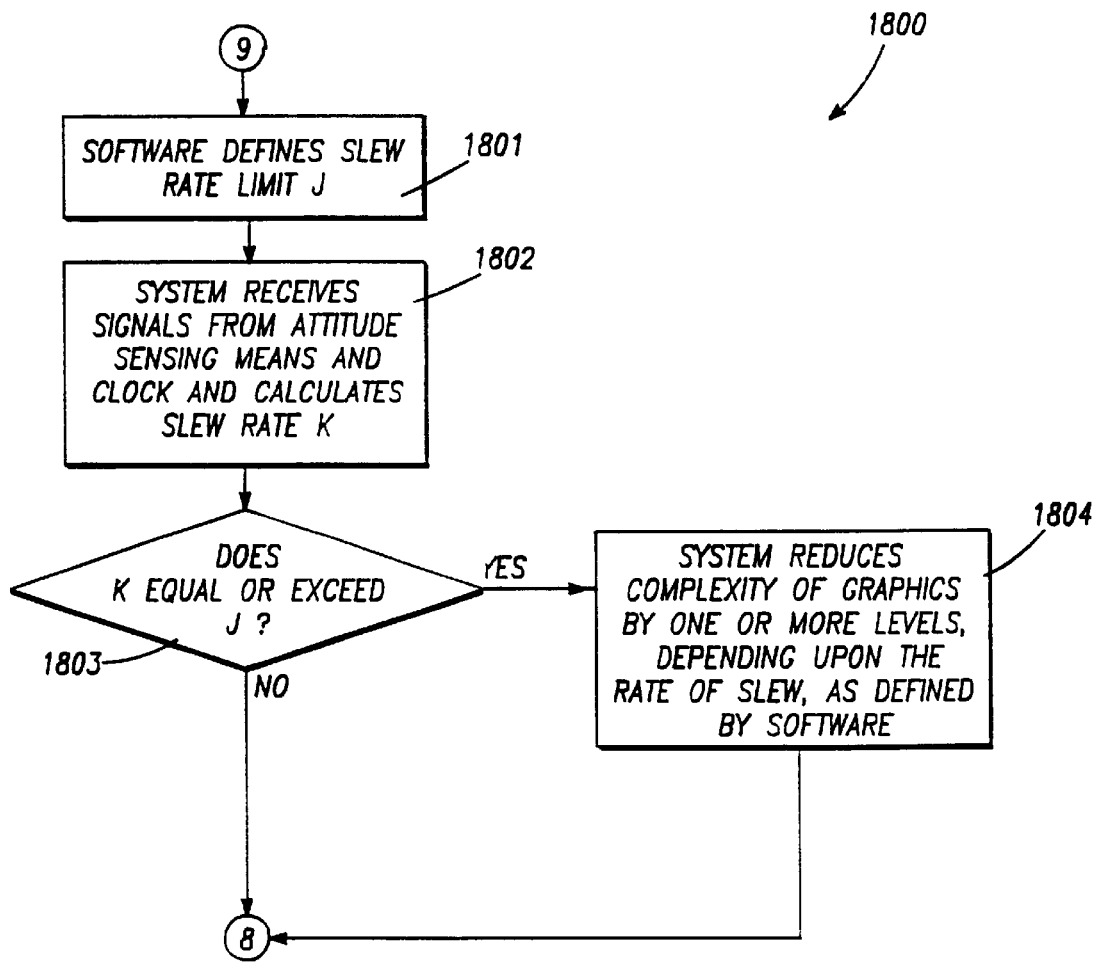
Figure 21:
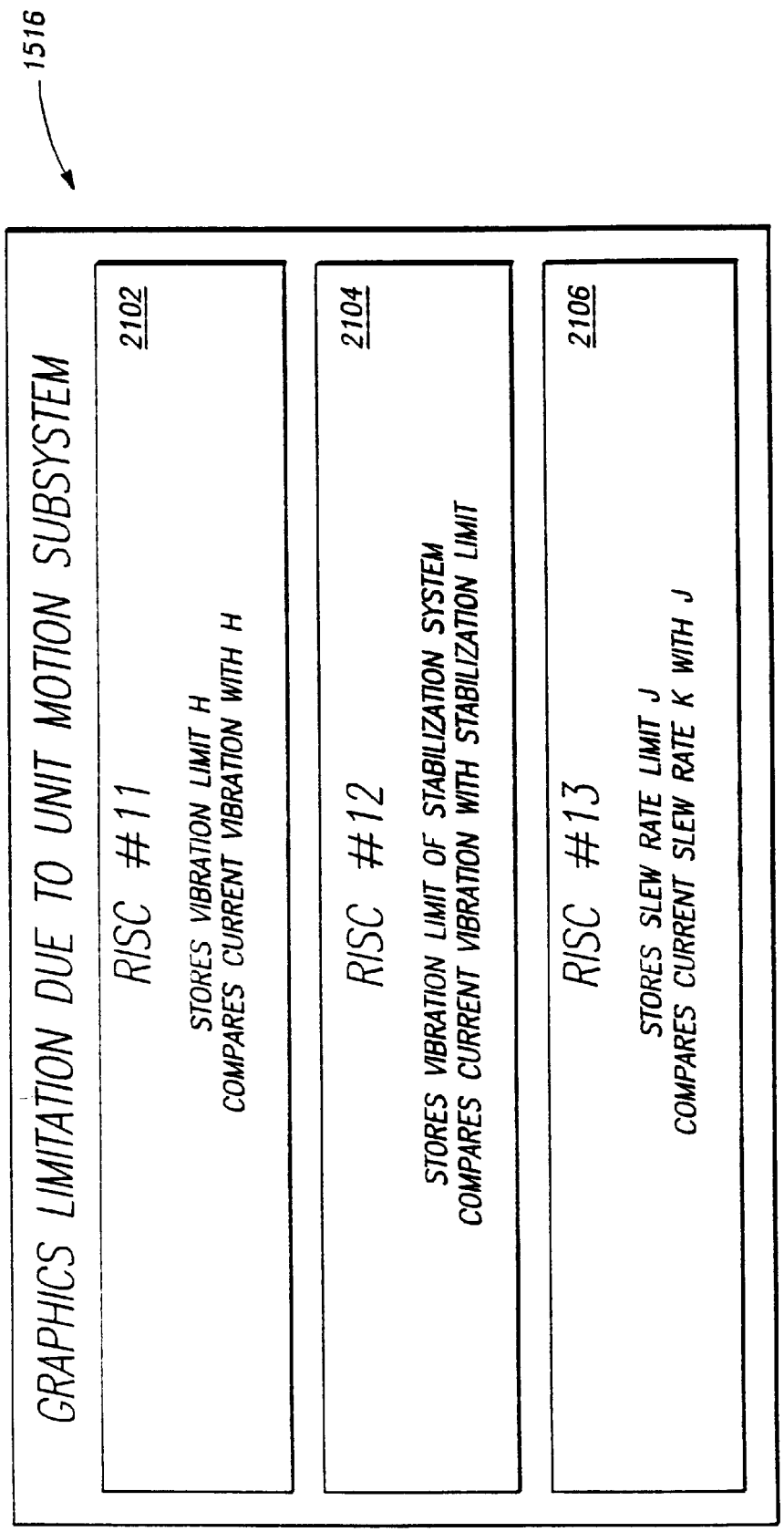
FIG. 21 illustrates a Graphics Limitation Due to Unit Motion Subsystem that can be used by an embodiment of the present invention.

FIGS. 17 and 18 show the operation of the graphics limitation due to unit motion subsystem 1516. FIG. 21 is a block diagram of an embodiment of the hardware used to implement the graphics limitation due to unit motion subsystem 1516. FIGS. 17 and 18 illustrate flowcharts 1700 and 1800 that show how the software that is used to implement the graphics limitation due to unit motion subsystem 1516 operates in relation to detected vibration of vision system 1514 as registered by the piezo-electric gyros 1515. In step 1701 the system 1516 defines the application specific vibration limit H. The vision system 1514 will begin to decrease the complexity of all graphics when the level of vibration rises above the limit H. The "level of vibration" is typically measured by a number of changes in motion (e.g. direction of motion) over a period of time. Thus, the "level of vibration" is a "vibration rate" which might be a rate of direction changes, for example. In step 1702 the subsystem 1516 receives motion signals from the piezo-electric gyros 1515 and time signals from the clock 1501 and calculates the vibration rate. These gyros are also typically associated with a deformable prism image stabilization system (not shown) of the vision system 1514, though the gyros may be independent of any other device 1514 subsystems. In step 1703 the system 1514 ascertains whether the calculated vibration rate exceeds the vibration limit H. If the calculated vibration rate does not exceed H, the flowchart 1700 branches to step 1801 of FIG. 18 which describes additional operations of the graphics limitation due to unit motion subsystem 1516. If the calculated vibration rate does exceed the vibration limit H, the flowchart 1700 branches to step 1704. In step 1704 the system 1514 ascertains whether the calculated vibration rate exceeds the ability of a stabilization system to stabilize the image displayed by the vision system. The image stabilization system is typically specified as being able to handle maximum vibration rate. If the calculated vibration rate does not exceed the ability of the vision system stabilization system to stabilize the image, the flowchart 1700 branches to step 1706. If the calculated vibration rate does exceed the ability of the vision system stabilization system to stabilize the image, the flowchart 1700 branches to step 1705.

In step 1705, the system 1516 reduces the "complexity level" of all recalled graphic objects by an appropriate number of "complexity levels" based upon the severity of the vibration detected. In the present embodiment, for example, the complexity level may be reduced by two or more levels in response to a determination that the vibration exceeds the ability of the stabilization system to compensate for the vibration. It may be appropriate in embodiments of the invention to reduce the complexity level by a greater amount when the stabilization system is no longer able to compensate for vibrations because, under such circumstances, the vibrations likely will be more severe.

Even when the stabilization system is able to handle the vibration, in the present embodiment the complexity level is reduced because the user likely will be vibrating. Accordingly, in step 1706 the system 1514 reduces by one "level" the "complexity level" of all of the graphic objects being displayed. In the present embodiment, to reduce complexity levels, one or more complexity levels may be defined to represent each graphic object. Thus, one graphic object may be represented by one complexity level. A second graphic object, on the other hand, may be represented by a plurality of complexity levels. The different complexity levels associated with a particular graphic object each visually represent that particular graphic object, but at different levels of complexity. These levels can range from highly complex, (e.g. a full blown raster image) to the minimum complexity required to impart the meaning of the graphic object to a user (e.g. a simple vector image).

The complexity of the graphic used represent a particular graphic object at any particular moment might be determined, for example, by assigning importance numbers to the graphic objects, for example, based upon the importance of a real world object with which the graphic object is associated. The importance number (IN) may be application defined. In a maritime navigation application, for example, the graphic objects associated with navigation markers may have a relatively high importance number. In a tourism application covering the same geographical area, however, the navigation markers are likely of lesser importance. Therefore, the graphic objects associated with the navigation markers may have a high importance number in the navigation application, but a lower importance number in the tourism application. The importance numbers assigned by an application could change as an application switches from one mode of operation to another. Using the above example, the system 1514 could be designed to operate in a particular geographical region with two modes of operation, navigation and tourism.

To change complexity levels, the system 1514 may control which graphical objects are displayed. For example, the system 1514 may display only the more important graphical objects when vibration occurs. Alternatively, the system 1514 may decrease complexity by progressively decreasing the resolution of some or all of the graphics objects being displayed based upon importance. Thus, for example, if the system 1514 was being used in the foregoing tourism context, the resolution of the markers might be decreased as a result of vibration so that the markers are displayed as only a rough geometric approximation. Alternatively, the markers may not be displayed at all in that context. To define the complexity levels, each complexity level is assigned a "complexity number." In the present embodiment, the complexity number is the number of calculations required to generate the graphical object associated with that particular complexity level. These different complexity levels are used by the system 1514 when allocating the resources of system 1514 for graphics generation.

FIG. 18 is a flowchart 1800 that shows the operation of a second portion of the graphics limitation due to unit motion subsystem 1516. This operation is similar to the operation described in FIG. 17 in the sense that it reduces complexity of graphic objects in response to detected conditions. The operation in FIG. 18, however, deals with a rate of attitude change rather than vibrations. In particular, subsystem 1516 in FIG. 18 operates in response to a detected attitude slew rate of vision system 1514. In the present embodiment, the slew rate of vision system 1514 is a rate of change of the attitude of the system 1514. In the present embodiment, subsystem 1516 is implemented using hardware that executes software. The hardware is described with reference to FIG. 25. Flowchart 1800 represents the operation of the software. In step 1801 of flowchart 1800 the subsystem 1516 defines a predefined attitude slew rate limit J. This limit J can be application specific; i.e. determined according to the requirements of the particular application. This limit J is the slew rate at which the system 1516 begins to reduce the complexity of graphic objects.

In step 1802 the system 1516 receives attitude signals from the attitude sensing device 1505 and clock signals from the clock 1501. The system 1516 calculates the actual attitude slew rate K of the vision system 1514 from these signals. In step 1803 the system 1516 ascertains whether the calculated attitude slew rate K exceeds the attitude slew rate limit J. If K does not exceed J, the flowchart 1800 branches to step 1901 of FIG. 19 and checks the display usage subsystem 1517. If K does exceed J, the flowchart 1800 branches to step 1804. In step 1804 the system 1514 reduces the complexity level of all graphics by one or more levels, the amount being defined by application specific complexity reduction slew rate thresholds. For example, if the measured slew rate K exceeds a first threshold, the complexity may be reduced to a complexity level associated with exceeding that first threshold. If the slew rate K exceeds a second threshold, the complexity may be reduced to a complexity level associated with exceeding that second threshold. The flowchart 1800 then branches to step 1901 of FIG. 19 and checks the display usage subsystem 1517.

Figure 19:
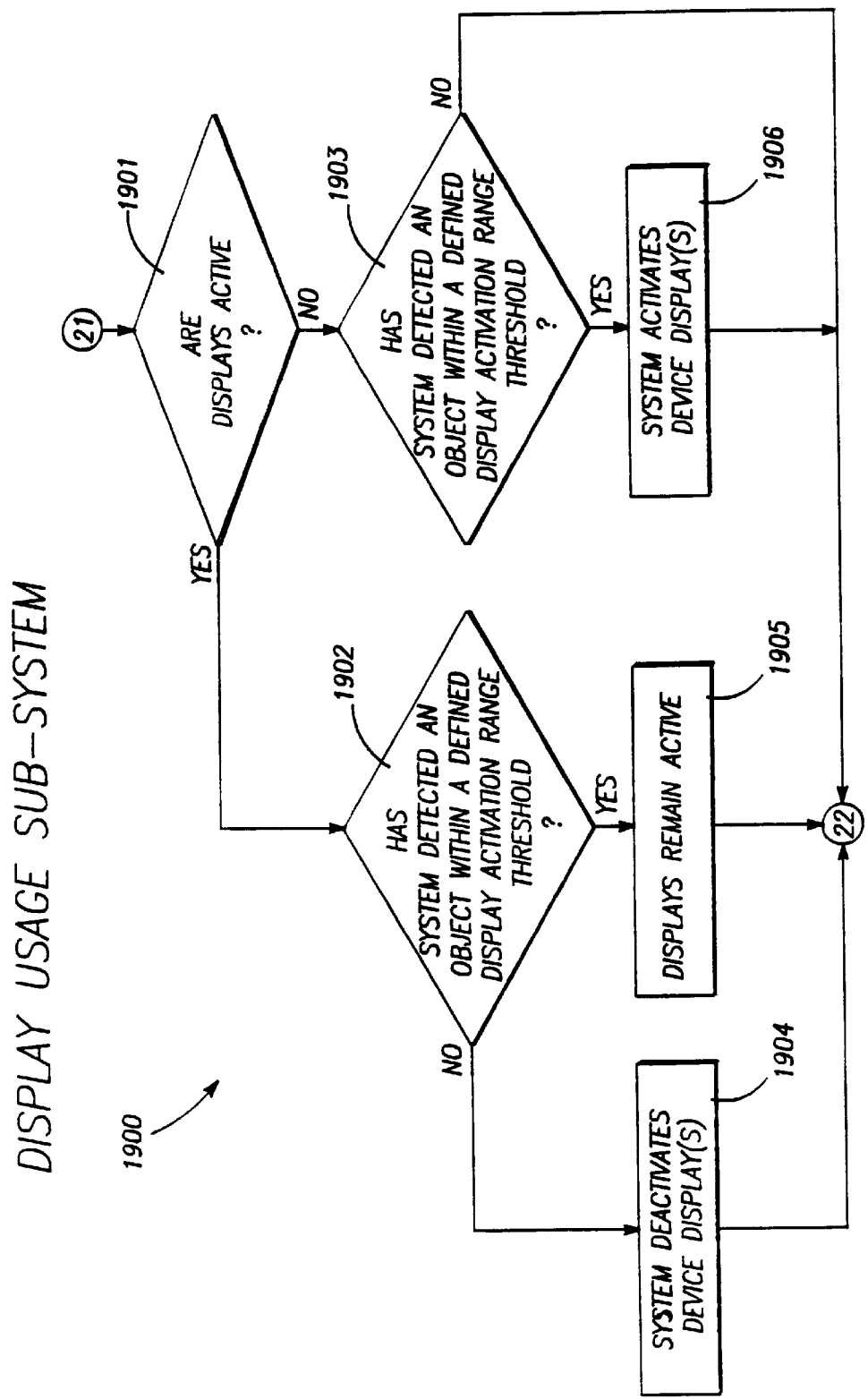
FIG. 19 illustrates the operation of a display usage subsystem that can be used by embodiments of the invention.

FIG. 19 is a flowchart 1900 showing the operation of the display usage subsystem 1519 of the system 1514. This subsystem 1519 detects whether a user is actually looking at the display(s) (not shown) of the vision system 1514 and activates or deactivates the display(s) accordingly. Note that some of the activities associated with the display, such as warming up the backlighting, might not be deactivated at all. Such activities may instead remain active while the vision system 1514 as a whole is fully deactivated. In step 1901 the subsystem 1519 ascertains whether the display(s) is/are active. If the display(s) is/are active the flowchart branches to step 1902. If the display(s) is/are not active the flowchart branches to step 1903.

In step 1902 the subsystem 1519 ascertains whether a physical object is within the application/user defined display activation range threshold of the system 1514. In the present embodiment the subsystem 1519 is designed to detect the proximity of a user's eyes for example. Such a determination may be made using a low power sonic or light emitting range finder or some other similar device. The user may want to modify this activation threshold to allow wearers of eyeglasses to use the system. Eyeglasses might affect the proximity measurement by the range finder by providing a reflective surface that is nearer to the display then the user's eyes. The preferred display activation range threshold could be part of a users usage profile. Such a usage profile might inform the system 1500 and/or the system 1514 about certain attributes associated with a particular user.

If the system 1519 in step 1902 detects an object within the display activation range threshold, the flowchart 1900 branches to step 1905 in which the display remains activated. The flowchart 1900 then branches to step 2001 of FIG. 20 to check the sleep subsystem 1518. If an object is not detected within the display activation range threshold in step 1902, the flowchart 1900 branches from step 1902 to step 1904. In step 1904, the display(s) is/are deactivated. The flowchart 1900 then branches to step 2001 of FIG. 20 to check the sleep subsystem 1518. If the flowchart 1900 branched from step 1901 to step 1903, in step 1903 the system 1519 ascertains whether an object is within the application/user defined display activation range threshold. If an object is detected within the display activation range threshold, the flowchart 1900 branches from step 1903 to step 1906 where the displays are activated. The system 1519 then branches to step 2001 of FIG. 20 to check the sleep subsystem 1518. If in step 1903 an object is not detected within the display activation range threshold, the flowchart 1900 branches to step 2001 of FIG. 20 to check the sleep subsystem 1518.

Figure 20:
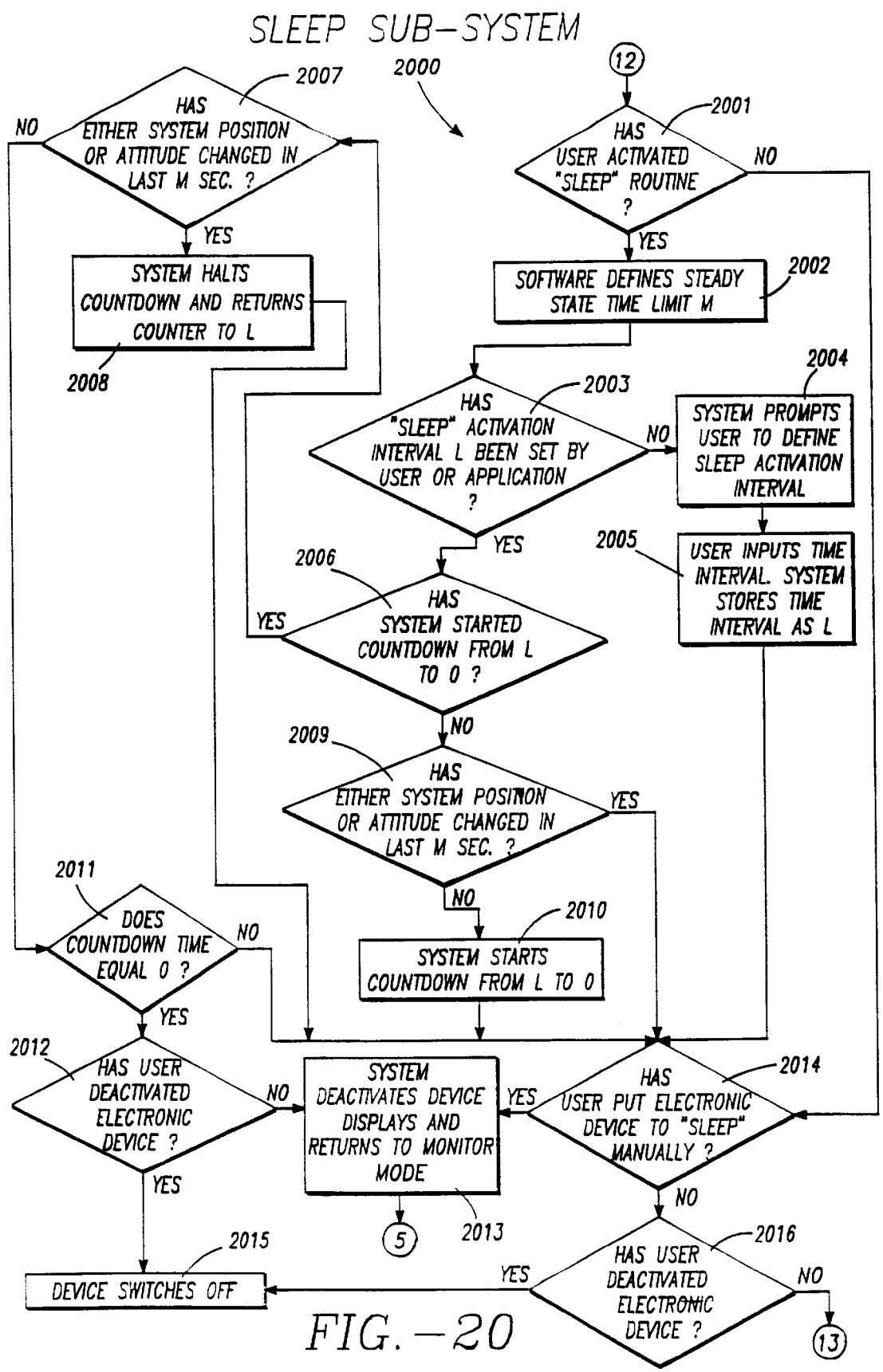
FIG. 20 illustrates the operation of a sleep sub-system that can be used by embodiments of the invention.

FIG. 20 is a flowchart 2000 that shows the operation of the sleep subsystem 1518. This flowchart 2000 can be read in conjunction with the flowcharts that illustrated system 200, for example. This subsystem 1518 returns the system 1500 to monitor mode, via connector 5, if the position or attitude of the vision system 1514 does not change over a user or application defined period of time. This subsystem 1518 illustrates an additional technique that can further reduce power consumption of the device being controlled by an embodiment of the invention.

The sleep subsystem 1518 is implemented by executing software using hardware. The operation of the software is illustrated by the flowchart 2000 of FIG. 20. The hardware to implement the sleep subsystem can be designed in any manner known in the art.

As shown in FIG. 20, in step 201 the sleep subsystem 1518 determines whether or not a user has activated a sleep routine. If not, the subsystem 1518 branches to step 2014. If so, the subsystem 1518 branches to step 2002. In step 2002 the subsystem 1518 defines a steady state time limit M. This time limit M is the time that the subsystem 1518 uses to determine if the system 1514 should be put to sleep. For example, if there have been no changes in attitude and position of the system 1514 within the previous time M, then the subsystem 1518 will put the system 1514 to sleep.

From step 2002, the subsystem 1518 branches to step 2003. In step 2003, the subsystem 1518 tests to determine if a sleep activation interval has been specified by a user or by some other device, for example. The sleep activation interval is used by the subsystem 1518 in the same manner as the time limit M. For example, if there have been no changes in attitude and position of the system 1514 within the previous time L, then the subsystem 1518 will put the system 1514 to sleep. The difference between M and L is that M is specified by the subsystem 1518 itself, whereas L is specified by a user. If a sleep activation interval L has been specified, the subsystem 1518 branches to step 2006. If a sleep activation interval has not been specified, the subsystem 1518 branches to step 2004.

In step 2006, the subsystem 1518 test to determine if it has started to countdown from L to zero. This countdown starts whenever neither of the position and attitude of the device 1514 are changing. If the subsystem 1518 has started this countdown, the subsystem 1518 branches to step 2007. If the subsystem 1518 has not started the countdown, the subsystem 1518 branches to step 2009.

In step 2009, the subsystem 1518 tests to determine if the position or attitude of the vision system 1514 has changed in the last M seconds. If at least one of the position and attitude has changed, then the subsystem 1518 branches to step 2014. If one of the position and attitude has not changed, then the subsystem 1518 branches to step 2010. In step 2010 the subsystem 1518 counts down from L to zero and then branches to step 2014.

If the subsystem 1518 branched to step 2004, the system 1500 prompts the user to define a sleep activation interval L. The subsystem 1518 then branches to step 2005. In step 2005 the user inputs to the system 1500 the time interval L. The system 1500 communicates this time interval to the subsystem 1518 and the subsystem 1518 stores this time interval as L. The subsystem 1518 then branches to step 2014.

If the subsystem 1518 branched to step 2007, the step 2007 tests to determine if the position or attitude of the vision system 1514 has changed in the last M seconds. If one of the position and attitude has changed, the subsystem 1518 branches to step 2008. In step 2008 the subsystem 1518 halts the countdown from L to zero and resets the counter performing the countdown to L. The subsystem 1518 branches from step 2008 to step 2014. If in step 2007 the subsystem 1518 determines that one of the position and attitude has not changed, the subsystem 1518 branches to step 2011. In step 2011 the subsystem 1518 tests to determine if the countdown equals zero. If the countdown does not equal zero, the subsystem 1518 branches to step 2014. If the countdown does equal zero, the subsystem 1518 branches from step 2011 to step 2012. In step 2012 the subsystem 1518 tests to determine if the device 1514 has been deactivated (e.g by the user or by some other device). If the device 1514 has been deactivated, the subsystem 1518 branches to step 2015 where the system 1500 switches off. If the device 1514 has not been deactivated, the subsystem 1518 branches from step 2012 to step 2013.

If the subsystem 1518 has branched to step 2014, in step 2014 the subsystem 1518 tests to determine if the user or some other device has put the system 1514 to sleep either manually or through the action of the other device. If the system 1514 has been put to sleep, the subsystem 1518 branches to step 2013. In step 2013 the system 1500 deactivates the display(s) and returns to step 502 of FIG. 5. If the system 1514 has not been put to sleep, the subsystem 1518 branches to step 2016. In step 2016 the subsystem 1518 tests to determine if the system 1514 has been deactivated. If the system 1514 has been deactivated, the system 1500 switches off. If the system 1514 has not been deactivated, the subsystem 1518 branches to step 1604 of FIG. 16.

The hardware that implements the time triggers 106 and 206 is illustrated in FIG. 12. The time triggers 106 and 206 include four RISC processors 1202, 1204, 1206 and 1208. These processors are programmed to each perform portions of the operations described with respect to FIG. 5. RISC processor 1202 stores the monitor limit W and compares the elapsed time reading Z with W. Processor 1204 keeps track of the elapsed time reading Z. Processor 1208 stores the "last checked" time Y and calculates the time that has elapsed from the time Y to the present time. Processor 1206 stores the activation interval X and compares to the activation interval X to the time that has elapsed from the time Y to the present time. Multiple processors need not be used. In particular, alternate embodiments might use a different number of processors, a single RISC or CISC processor or even other types and/or combinations of hardware that perform appropriate functions to implement an embodiment of the invention.

The hardware that implements the attitude triggers 109 and 209 is illustrated in FIG. 13. The attitude triggers 109 and 209 include five RISC processors 1302, 1304, 1306, 1308 and 1310. These processors are programmed to each perform portions of the operations described with respect to FIG. 10. Processor 1308 stores the "last received" attitude B and calculates the degrees per second rate of attitude change from the time the attitude B was stored to the time the new attitude is stored. Processor 1302 stores the "Degrees per Second" activation limit C and compares this limit C to the degrees per second value calculated by the processor 1308. Processor 1304 stores the steady state attitude reading A and calculates the difference between the last received attitude and A. Processor 1306 stores the "Record New Steady State A" Limit E and compares the degrees per second value calculated by processor 1308 to the limit E. Processor 1310 stores the "Degrees From Steady State" Activation limit E and compares the limit E to difference calculated by processor 1304. Multiple processors need not be used. In particular, alternate embodiments might use a different number of processors, a single RISC or CISC processor or even other types and/or combinations of hardware that perform appropriate functions to implement an embodiment of the invention.

The hardware that implements the position triggers 108 and 208 is illustrated in FIG. 14. The position triggers 108 and 208 include three RISC processors 1402 and 1404 and graphics controller 1406. These processors are programmed to each perform portions of the operations described with respect to FIG. 11. The graphics controller also performs some of the functions described with respect to FIG. 11. Processor 1402 stores the "last stop" position G and calculates the range from the current position to the last stop position G. Processor 1404 stores the set distance F and compare the range calculated by processor 1402 to the distance F. Graphics controller 1406 calculates the range to all areas that a user has specified are of interest and that have associated range activation thresholds. Multiple processors need not be used. In particular, alternate embodiments might use a different number of processors, a single RISC or CISC processor or even other types and/or combinations of hardware that perform appropriate functions to implement an embodiment of the invention.

FIG. 21 is a block diagram of a preferred embodiment of the hardware used to implement the graphics limitation due to unit motion subsystem 1516. The subsystem 1516 includes three RISC processors 2102, 2104 and 2106. Each of the RISC processors is programmed to perform a portion of the operation described with respect to FIGS. 17 and 18. For example, RISC processor 2102 is programmed to store the vibration limit H and compare the current measured vibration of system 1514 to H. RISC processor 2104 is programmed to store the vibration limit of the stabilization system and compare the current measure vibration of subsystem 1514 to the vibration limit of the stabilization subsystem of system 1514. The RISC processor 2106 stores the slew rate limit J and compares J to the measured slew rate K of the system 1514.

FIG. 22 illustrates the hardware of the AIT 211 of FIG. 2. As shown, the AIT 211 uses 7 RISC processors 2202, 2204, 2206, 2208, 2210, 2212, and 2214. RISC processor 2202 stores the AIT interval value. Processor 2204 stores the time at which the monitor mode of the system 200 was activated. This time is the time that was first read in step 502 of FIG. 5. Processor 2206 calculates the time elapsed from the time stored by processor 2204 to the present time where the present time is the time most recently read by the system 200 in step 502. Processor 2208 compares the elapsed time (DTI) calculated by processor 2206 with the AIT interval value stored in processor 2202. Processor 2210 determines if the user has activated the device 214. If so, the elapsed time calculated in processor 2206 becomes a Down Time Interval (DTI). The processor 2210 stores this DTI in a list of DTI's. If the list is full, the oldest DTI is bumped from the list. Processor 2212 compares each of the DTI's in the list created by processor 2210 with each of the other DTI's in this list to determine if a majority of the DTI's in the list are within a predefined tolerance of each other. Processor 2214 averages the DTI's that are within the predefined tolerance of each other, if any. This average is stored by the processor 2202 as a new value for the AIT interval value. Multiple processors need not be used. Alternate embodiments might use a different number of processors, a single RISC or CISC processor or even other types and/or combinations of hardware that perform appropriate functions to implement an embodiment of the invention.

FIG. 23 illustrates the hardware of the RAT 212 of FIG. 2. As shown, the RAT 212 uses 6 RISC processors 2302, 2304, 2306, 2308, 2310, and 2312. RISC processor 2302 places the present attitude of the device 214 in a list of attitude readings. If the list is full, the oldest attitude reading is bumped from the list. Processor 2304 stores the repetitive action trigger setting. Processor 2306 compares each value of the list generated by processor 2302 with the RAT setting stored by processor 2304. Processor 2308 determines if the user has activated the electronic device 214. If so, the list of attitude readings generated by the processor 2302 is stored at the top of a list of motion routines. If the list of motion routines is full, the oldest motion routine is bumped from the list of motion routines. Processor 2310 compares each of the motion routines in the list to each other to determine if a majority of motion routines are within a predefined tolerance of any other motion routine in the list. Processor 2312 averages the motion routines that are within the predefined tolerance of each other. The processor 2304 stores this average as a new value for the RAT setting. Multiple processors need not be used. Alternate embodiments might use a different number of processors, a single RISC or CISC processor or even other types and/or combinations of hardware that perform appropriate functions to implement an embodiment of the invention. In particular, alternate embodiments might use a different number of processors, a single RISC or CISC processor or even other types and/or combinations of hardware that perform appropriate functions to implement an embodiment of the invention.

FIG. 24 illustrates the hardware of the RDT 213 of FIG. 2. As shown, the RDT 213 uses 7 RISC processors 2402, 2404, 2406, 2408, 2410, 2412, and 2414. RISC processor 2402 stores the RDT repetitive distance value. Processor 2404 stores the position of the system 200 when the monitor mode of the system 200 was first activated. This position is the position that was first read during the first pass through the position trigger operation as illustrated in FIG. 11. Processor 2406 calculates the distance between the present position and the position stored by processor 2404. Processor 2408 compares the distance calculated by processor 2406 with the RDT repetitive distance value stored by processor 2402. Processor 2410 determines if the user has activated the device 214. If so, the distance calculated in processor 2406 becomes a Down Distance Interval (DDI). The processor 2410 stores this DDI in a list of DDI's. If the list is full, the oldest DDI is bumped from the list. Processor 2412 compares each of the DDI's in the list created by processor 2410 with each of the other DDI's in this list to determine if a majority of the DDI's in the list are within a predefined tolerance of each other. Processor 2214 averages the DDI's that are within the predefined tolerance of each other, if any. This average is stored by the processor 2402 as a new value for the RDT repetitive distance value. Multiple processors need not be used. Alternate embodiments might use a different number of processors, a single RISC or CISC processor or even other types and/or combinations of hardware that perform appropriate functions to implement an embodiment of the invention.

Figure 25:
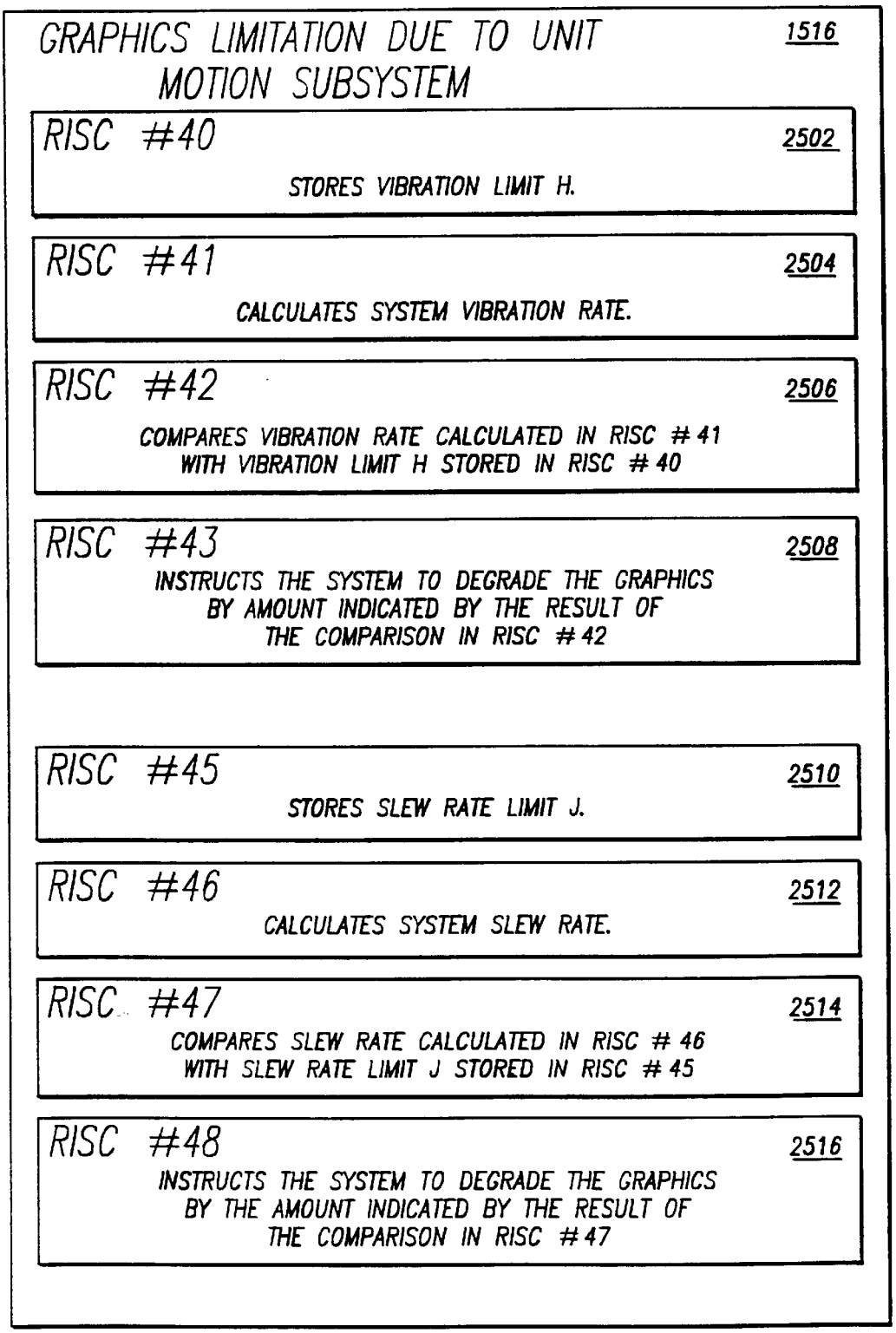
FIG. 25 illustrates the hardware of the graphics limitation due to unit motion subsystem.

FIG. 25 illustrates the hardware of the graphics limitation due to unit motion (GLDUM) subsystem 1516. As shown, the GLDUM subsytem 1516 uses 8 RISC processors 2502, 2504, 2506, 2508, 2510, 2512, 2514 and 2516. RISC processor 2502–2508 deal with vibration of the electronic device 214. RISC processors 2510–2516 deal with attitude change of the electronic device 214. RISC processor 2502 stores the vibration limit H. Processor 2504 calculates the vibration rate of the vision system 1514. Processor 2506 compares the vibration rate calculated by processor 2504 with the vibration limit stored by processor 2506. Processor 2508 instructs the system 1514 to degrade the complexity of displayed graphics objects according to the result of the comparison by processor 2506. Processor 2510 stores the attitude slew rate limit J of the system 1514. Processor 2512 calculates an actual slew rate of the attitude of the system 1514. Processor 2514 compares the actual slew rate calculated by processor 2514 with the slew rate limit J stored by processor 2510. Multiple processors need not be used. Alternate embodiments might use a different number of processors, a single RISC or CISC processor or even other types and/or combinations of hardware that perform appropriate functions to implement an embodiment of the invention.

Figure 26:
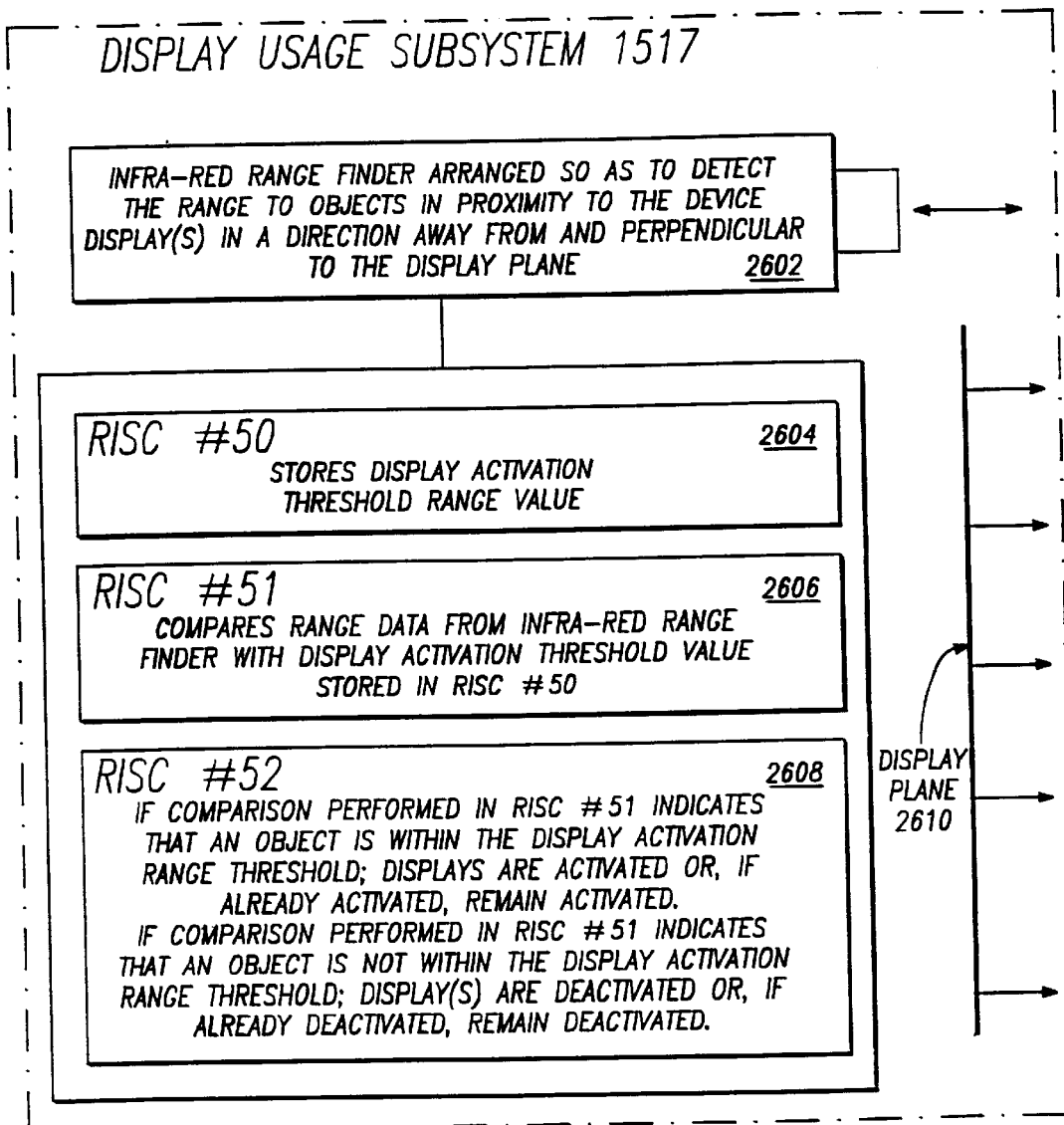
FIG. 26 illustrates the hardware of the display usage subsystem 1517.

FIG. 26 illustrates the display usage subsystem 1517. As shown, the display usage subsystem 1517 uses a range finder 2602, 3 RISC processors 2604, 2606 and 2608 and a display plane 2610. The range finder 2602 might be an infra-red range finder arranged to detect the range to objects in proximity to the display plane 2610 of the device 1514. In the present embodiment, the range is tested in a direction away from and perpendicular to the display. The display plane 2610 corresponds to a display, such as a video monitor or a heads up display, that presents images to a user. RISC processor 2604 stores the display activation range threshold. Processor 2606 compares the range data from the infra-red range finder 2602 to the display activation threshold stored by processor 2604. If the comparison performed by processor 2606 indicates that an object is within the display activation range threshold, the processor 2608 activates the display, or if already activated allows the display to remain activated. If the comparison performed by processor 2606 indicates that an object is not within the display activation range threshold, the processor 2608 deactivates the display, or if already deactivated allows the display to remain deactivated. Multiple processors need not be used. Alternate embodiments might use a different number of processors, a single RISC or CISC processor or even other types and/or combinations of hardware that perform appropriate functions to implement an embodiment of the invention.

While Applicant has described the invention in terms of specific embodiments, the invention is not limited to or by the disclosed embodiments. The Applicant's invention may be applied beyond the particular systems mentioned as examples in this specification. Although a variety of circuits have been described in this specifications, embodiments of the invention need not use all of the specific circuits described herein. In addition, alternate embodiments might use alternative circuits for some or all of the circuits. For example, the RISC processor of FIGS. 12–14 could be replace by a CISC processor, a single RISC processor or alternate circuitry that accomplishes the described functions. In addition, while portions of the embodiments have been disclosed as software, alternate embodiments could implement some or all of the software functions in hardware. Alternate embodiments of the invention might also use alternative sensing methods or devices to accomplish the purposes disclosed herein. Limits and/or thresholds expressed herein as upper (or lower) limits might in alternate embodiments be implemented as lower (or upper) limits. Where the present embodiments discuss activation of an electronic device, alternate embodiments might be used in a similar manner to deactivate electronic devices. Similarly, while the flow charts of the present embodiment are in terms of "activation of the device." Alternate embodiments may be designed to activate (or deactivate) portions of the device to provide a progressive activation or a progressive deactivation, for example.

What is claimed is:

1. A method for controlling an electronic device, comprising:

sensing one or more physical characteristics of the device, the one or more physical characteristics including one or more of: an attitude of the electronic device and a position of the electronic device;

supplying a control signal to the device, the control signal triggered by one or more pre-defined values of at least one of the one or more physical characteristics of the device;

switching the device from a first mode to a second mode in response to the control signal, the first mode being associated with a first level of power consumption of at least a portion of the electronic device, the second mode being associated with a second level of power consumption of at least the portion of the electronic device, wherein the first level of power consumption consumes more power when at least a portion of the electronic device is in an activated state than the second level of power consumption when at least a portion the electronic device is in a deactivated state.

2. The method of claim 1, wherein the position of the electronic device is received from a position sensing device.

3. The method of claim 1, wherein the position of the electronic device is received from a satellite based positioning system.

4. The method of claim 1, wherein the position of the electronic device is received from an inertial navigation system.

5. The method of claim 1, wherein the attitude of the electronic device is received from an attitude sensing device.

6. The method of claim 1, wherein the attitude of the electronic device is received from a magnetic flux sensing device.

7. The method of claim 1, wherein the attitude of the electronic device is received from an inclinometer.

8. The method of claim 1, wherein the attitude of the electronic device is received from a laser ring gyro.

* * * * *